(12) United States Patent
Nakagawa et al.

(10) Patent No.: US 8,150,598 B2
(45) Date of Patent: Apr. 3, 2012

(54) ENGINE CONTROLLER

(75) Inventors: Shinji Nakagawa, Hitachinaka (JP);
Kazuhiko Kanetoshi, Hitachinaka (JP);
Kozo Katogi, Hitachi (JP); Takanobu Ichihara, Naka (JP); Minoru Ohsuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 12/470,202

(22) Filed: May 21, 2009

(65) Prior Publication Data
US 2009/0292448 A1 Nov. 26, 2009

(30) Foreign Application Priority Data

May 23, 2008 (JP) ................................ 2008-135293

(51) Int. Cl.
*G06F 19/00* (2011.01)
(52) U.S. Cl. ................................... 701/103; 123/406.47
(58) Field of Classification Search .......... 701/103–105; 123/406.11, 406.47, 406.49, 406.53
See application file for complete search history.

(56) References Cited

U.S. PATENT DOCUMENTS

| | | | | |
|---|---|---|---|---|
| 5,495,835 A | * | 3/1996 | Ueda | 123/339.11 |
| 5,657,625 A | * | 8/1997 | Koga et al. | 60/274 |
| 5,713,197 A | * | 2/1998 | Ogawa et al. | 60/276 |
| 2002/0092293 A1 | * | 7/2002 | Yasui et al. | 60/278 |
| 2004/0040550 A1 | * | 3/2004 | Someno et al. | 123/704 |
| 2007/0261671 A1 | | 11/2007 | Nakagawa et al. | |
| 2008/0086257 A1 | * | 4/2008 | Iihoshi et al. | 701/105 |
| 2009/0159042 A1 | * | 6/2009 | Nakagawa et al. | 123/334 |

FOREIGN PATENT DOCUMENTS

| | | |
|---|---|---|
| JP | 8-86236 A | 4/1996 |
| JP | 8-122099 A | 5/1996 |
| JP | 9-88680 A | 3/1997 |
| JP | 11-280518 A | 10/1999 |
| JP | 2007-154814 A | 6/2007 |
| JP | 2007-303353 A | 11/2007 |
| JP | 2007-303354 A | 11/2007 |
| JP | 2008-38732 A | 2/2008 |

OTHER PUBLICATIONS

Japanese Office Action dated Sep. 7, 2010 (Three (3) pages).

* cited by examiner

*Primary Examiner* — John Kwon
(74) *Attorney, Agent, or Firm* — Crowell & Moring LLP

(57) ABSTRACT

An engine controller capable of optimizing both the air-fuel ratio and the ignition timing to provide HC-minimized performance under the relevant driving conditions (environmental conditions) in order to minimize the amount of HC emitted from an engine at the time of start-up (before catalyst activation) is provided. The engine controller includes: air-fuel ratio control means for controlling the air-fuel ratio to be within a predetermined range (for example, 14.5 to 16.5) when the engine is operated at a certain driving condition (for example, in a state in which the catalyst is not activated such as the time of starting a cooler, or idling time); and ignition timing correction means for correcting the ignition timing to the retard side when the engine is operated at the certain driving condition and the air-fuel ratio is within the predetermined range.

15 Claims, 30 Drawing Sheets

Means for directly or indirectly detecting degree of stability of the engine

Means for directly or indirectly detecting degree of stability of the engine

FIG. 35

<Basic fuel injection amount calculation means 120>

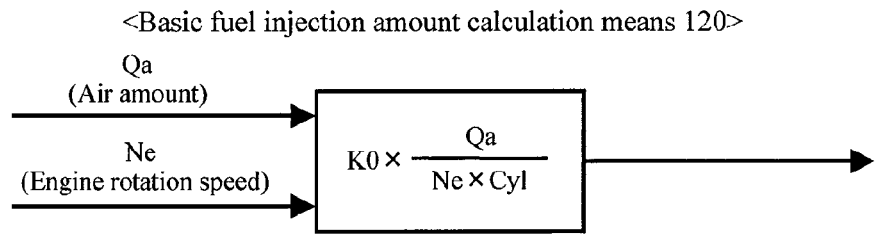

FIG. 36

<Fuel injection amount correction permission means 130>

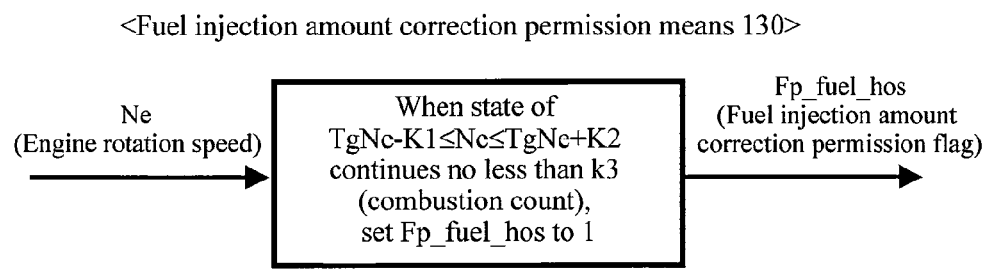

FIG. 37

<Fuel injection amount correction value calculation means 140>

When Fp_fuel_hos (fuel injection amount correction permission flag) is 1, present processing is performed

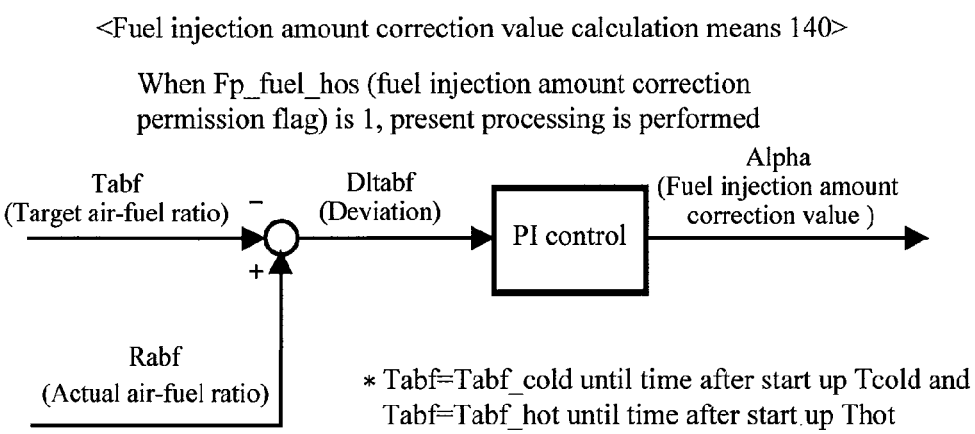

* Tabf=Tabf_cold until time after start up Tcold and
  Tabf=Tabf_hot until time after start up Thot <Basic ignition timing calculation means 150>

<Ignition timing correction permission means 160>

* Tabf=Tabf_cold until time after start-up Tcold and
  Tabf=Tabf_hot until time after start-up Thot <Fuel injection amount correction permission means 230>

<Fuel injection amount correction value calculation means 240>

<Ignition timing correction permission means 260>

<Ignition timing correction amount calculation means 270>

ENGINE CONTROLLER

BACKGROUND OF THE INVENTION

1. Field of the Invention

The present invention relates to an engine controller that controls an air-fuel ratio, ignition timing, etc., and specifically relates to an engine controller capable of enhancing exhaust emission characteristics at the time of start-up.

2. Background Art

In recent years, with the tightening of regulations on automotive engine exhaust around the world including North America, Europe and Japan, there is a demand for further enhancing the exhaust emission characteristics of engines. In order to enhance the catalyst performance and the accuracy of catalyst control to conform the latest or future exhaust regulations, the main problem to be solved is reduction of the amount of HC (hydrocarbon) emitted for several tens of seconds after start-up of the engine and before activation of the catalyst.

It is known that retarding the ignition timing is effective for reduction of HC (emission amount) before catalyst activation. In particular, when the ignition timing is retarded, the thermal efficiency is lowered, and thus, in order to maintain a constant torque, it is necessary to increase the fuel amount (air amount), and accompanied by that, the amount of generated heat is also increased. As a result of the increase in the amount of generated heat, the temperature of the exhaust is raised, and unburned fuel is burned in combustion chambers and an exhaust pipe, substantially lowering the HC concentration. Furthermore, as a result of the exhaust temperature increase, catalyst activation is advanced.

As illustrated in FIG. 19, an HC reduction effect provided by retarding the ignition timing varies depending on the air-fuel ratio. In particular, it can be seen that a largest HC reduction effect can be obtained with an air-fuel ratio of from 15 to 16. Meanwhile, it has been known that the air-fuel ratio is made to be lean, the stability of combustion deteriorates. Furthermore, it has been known that if the amount of retarding is increased, the stability of combustion also deteriorates. In the environment of practical use, various disturbances, such as variations in fuel quality and manufacturing errors and temporal changes of various types of devices, occur, and thus, it is necessary to ensure robustness against these disturbances, that is, it is necessary to secure a margin for stability as well as the air-fuel ratio and the retarding amount, making it impossible to set the air-fuel ratio and the retarding amount to be in a condition in which the HC concentration is the smallest, as illustrated in FIG. 20.

From the circumstances described above, as can be seen in, e.g., JP Patent Publication (Kokai) No. 2007-303354 A, many methods in which on-board optimization of the air-fuel ratio is performed in a very early period of the start-up time using a parameter correlated with the air-fuel ratio, such as engine speed variation, has been proposed. Also, as can be seen in JP Patent Publication (Kokai) No. 8-122099 A (1996) (JP Patent No. 3574853), many methods in which on-board optimization of the ignition timing (retarding amount) is performed also using a parameter correlated with the combustion stability, such as engine speed variation, has been proposed.

SUMMARY OF THE INVENTION

However, there are almost no applications filed for methods in which "on-board optimization of both the air-fuel ratio and the retarding amount are performed" in order to maximize the HC reduction effect provided by retarding the ignition timing as described above. JP Patent Publication (Kokai) No. 9-88680 A (1997) proposes that: the ignition timing is retarded until target engine speed variation is reached; and when the ignition timing (retarding amount) has a value smaller than a predetermined value, the fuel amount is increased. However, in such measure, the ignition timing is first retarded, and thus, as illustrated in FIG. 20, at the set value for securing a margin for stability, only a small HC reduction effect can be obtained even though the ignition timing is retarded. In addition, since the fuel amount is increased (the air-fuel ratio is decreased) if the retarding amount is smaller than a predetermined value, the HC emissions will be increased in fact.

To summarize the above, although it is necessary to optimize both the air-fuel ratio and the ignition timing in order to minimize the amount of HC emitted from an engine at the time of start-up (before activation of a catalyst), the initially-set values cannot be made to be optimum values in consideration of various disturbances in the environment of practical use, making it possible to provide HC-minimized performance that can be provided under the relevant driving conditions (environmental conditions) for individual engines.

The present invention has been made in view of the above-described circumstances, and an object of the present invention is to provide an engine controller capable of providing HC-minimized performance under the relevant driving conditions (environmental conditions) for individual engines.

In order to achieve the above object, the mechanism of combustion stability deterioration as a result of the air-fuel ratio becoming lean, and the mechanism of combustion stability deterioration as a result of the ignition timing being retarded have been clarified, and from that knowledge, a method for performing on-board optimization of both the air-fuel ratio and the ignition timing has been considered as described below.

As illustrated in FIG. 21, conventionally, it is empirically known that the air-fuel ratio becomes lean, the stability of the engine (i.e., combustion) deteriorates. FIG. 22 illustrates the profile of in-cylinder pressure in A1, i.e., a rich air-fuel ratio, in FIG. 21. The driving conditions are idling and no load. The abscissa axis represents the crank angle in a range of 270 to 540° CA. Here, 360° CA indicates the compression TDC. The ordinate axis is the in-cylinder pressure. More specifically, the curve represents an average in-cylinder pressure value for 60 cycles, and what is indicated by "+" is sampled in-cylinder pressure values for the respective cycles (the sampling rate is 10° CA). In other words, FIG. 22 illustrates an average in-cylinder pressure value for 60 cycles and variation for the respective cycles when the air-fuel ratio is rich. It can be seen that the in-cylinder pressure variation occurs from 350 to 400° CA, during which combustion pressure is generated. This variation is the root cause for unstable combustion.

FIG. 23 illustrates the profile of in-cylinder pressure in A3, e.g., a lean air-fuel ratio, in FIG. 21. The driving conditions are the same as those in FIG. 22. Also, the abscissa and ordinate axes are the same as those in FIG. 22. Also, the "curve" represents an average in-cylinder pressure value for 60 cycles, and what is indicated by "+" is sampled in-cylinder pressure values for respective cycles. In other words, FIG. 23 illustrates an average in-cylinder pressure value for 60 cycles and variation for the respective cycles when the air-fuel ratio is lean. It can be seen that in-cylinder pressure variation, which is the cause for unstable combustion, occurs from 350 to 430° CA, during which combustion pressure is generated.

Comparing FIGS. 22 and 23, the driving conditions are the same, and thus, there is almost no difference in an average value of the in-cylinder pressure profile between them. Meanwhile, the time during which the in-cylinder pressure variation occurs is longer in the case of the lean air-fuel ratio. It can be considered that this is caused because the combustion velocity becomes lower as the air-fuel ratio becomes leaner.

FIG. 24 illustrates in-cylinder pressure profile variations for the respective cycles, which are illustrated in FIGS. 22 and 23 (which are indicated by "+" in FIGS. 22 and 23). The resolution is 10° CA. In addition, FIG. 24 illustrates the case of A2, i.e., the stoichiometry, in FIG. 21. It can be seen that as the air-fuel ratio becomes leaner, the variation in the in-cylinder pressure (combustion pressure) becomes larger and the range of variation becomes wider.

What is important is that the degree of this in-cylinder pressure variation is not equivalent to variation in combustion pressure work (torque). In other words, combustion pressure work W per unit angle variation can be expressed by formula (1) below.

$$W = P \times \Delta V \quad (1)$$

Here, P is the in-cylinder pressure, and $\Delta V$ is the variation in cylinder capacity per unit angle. According to formula (1), it can be understood that the variation in the combustion pressure work W can be obtained as a value obtained by the variation in the in-cylinder pressure P being multiplied by $\Delta V$. In other words, $\Delta V$ can be regarded a gain obtained when converting the variation in the in-cylinder pressure (combustion pressure) P into the variation in the combustion pressure work W. FIG. 24 illustrates how the variation in the in-cylinder pressure P changes as the air-fuel ratio becomes lean. FIG. 25 illustrates the profile of $\Delta V$ in addition to FIG. 24. $\Delta V$ is 0 at the compression TDC, and is the largest at an angle rotated by 90° CA from the compression TDC (450° CA). $\Delta V$ in FIG. 25 indicates the case where the cylinder capacity is 500 cc. There is a difference of dozens of times between $\Delta V$ near the compression TDC and $\Delta V$ near 90° CA after the compression TDC. Accordingly, the variation in in-cylinder pressure (combustion pressure) P near 90° CA after the compression TDC is amplified by dozens of times relative to the variation in the in-cylinder pressure (combustion pressure) P near the compression TDC, and emerges as variation in the combustion pressure work (torque).

FIG. 26 illustrates the variation in the in-cylinder pressure (combustion pressure) P and the variation in the combustion pressure work W relative to the air-fuel ratio. Here, for the variation in the in-cylinder pressure, the standard deviation of the in-cylinder pressure between the compression TDC and the angle 70 degrees after the compression TDC is indicated, and for the variation in the combustion pressure work, the standard deviation of the work amount between the compression TDC and the angle 70 degrees after the compression TDC is indicated. The variation in the in-cylinder pressure P becomes larger as the air-fuel ratio is leaner. This is attributed to the phenomenon illustrated in (1) in FIG. 25. Meanwhile, although the variation in the combustion pressure work becomes larger as the air-fuel ratio becomes leaner, the magnitude of the variation becomes larger than the variation in the in-cylinder pressure as the air-fuel ratio becomes leaner. This is attributed to the phenomenon illustrated in (2) in FIG. 25. In other words, as the air-fuel ratio becomes leaner, the range of the combustion pressure variation becomes wider (i.e., it is retarded), resulting in a larger effect of $\Delta V$ being imposed, and thus, from the perspective of combustion pressure work, larger variation can be seen.

The above is a description of the mechanism of the engine (combustion) becoming unstable when the air-fuel ratio becomes lean.

Next, the mechanism of the engine (combustion) becoming unstable when the ignition timing is retarded will be described.

As illustrated in FIG. 27, it has been known that when the ignition timing is retarded, the stability of the engine (combustion) also deteriorates. FIG. 22 illustrates the profile of the in-cylinder pressure in A1, i.e., the ignition timing not retarded, in FIG. 27. The driving conditions are idling and no load. The abscissa axis is the crank angle in a range of 270 to 540° CA. Here, 360° CA is the compression TDC. The ordinate axis is the in-cylinder pressure. More specifically, the curve indicates an average in-cylinder pressure value for 60 cycles, and what are indicated over the curve are sampled in-cylinder pressure values for the respective cycles (the sampling rate is 10° CA). In other words, FIG. 22 illustrates an average in-cylinder pressure value for 60 cycles and variation for the respective cycles when the ignition timing is not retarded. It can be seen that variation in the in-cylinder pressure occurs from 350 to 400° CA during which combustion pressure is generated. This variation is the root cause for unstable combustion.

FIG. 28 illustrates the profile of the in-cylinder pressure in A4, i.e., the ignition timing retarded, in FIG. 27. The driving conditions are the same as those in FIG. 22. Also, the abscissa and ordinate axes are the same as those in FIG. 22. Furthermore, the curve indicates an average in-cylinder pressure value for 60 cycles, and what are indicated over the curve are sampled in-cylinder pressure values for respective cycles. In other words, FIG. 28 indicates an average in-cylinder pressure value for 60 cycles and variation for the respective cycles when the ignition timing is retarded. It can be understood that the in-cylinder pressure variation, which is the root cause for unstable combustion, occurs from 380 to 430° CA, during which combustion pressure is generated.

Comparing FIGS. 22 and 28, the time during which in-cylinder pressure variation occur moves to the retard side when the ignition timing is retarded. This is because the time of generation of combustion pressure is retarded as a result of the ignition timing being retarded.

FIG. 29 illustrates in-cylinder pressure profile variations for respective cycles in FIGS. 22 and 28 (which are illustrated over the curves in FIGS. 22 and 28). The resolution is 10° CA. When the ignition timing is retarded, the variation in the in-cylinder pressure (combustion pressure) becomes small in fact; however, the variation range moves to the retard side.

FIG. 29 illustrates how the variation in the in-cylinder pressure P changes when the ignition timing is retarded. FIG. 30 illustrates the profile of $\Delta V$ in addition to FIG. 24. As described above, $\Delta V$ is 0 at the compression TDC, and is the maximum at an angle rotated by 90° CA from the compression TDC (450° CA). There is a difference of dozens of times between $\Delta V$ near the compression TDC and $\Delta V$ near 90° CA from the compression TDC. Accordingly, variation in in-cylinder pressure (combustion pressure) P near 90° CA after the compression TDC is amplified by dozens of times relative to variation in in-cylinder pressure (combustion pressure) P near the compression TDC, and emerges as variation in combustion pressure work (torque).

FIG. 31 illustrates the variation in the in-cylinder pressure (combustion pressure) P and the variation in the combustion pressure work W relative to the air-fuel ratio. It illustrates the cases where the ignition timing is not retarded and retarded, respectively. Here, for the variation in in-cylinder pressure, the standard deviation in in-cylinder pressure between the compression TDC and the angle 70 degrees from the compression TDC is indicated, and for the variation in combustion pressure work, the standard deviation of the work amount between the compression TDC and the angle 70 degrees after the compression TDC is indicated. The variation in in-cylinder pressure P becomes larger as the air-fuel ratio becomes leaner for both of the cases when the ignition timing is retarded and not retarded. Meanwhile, the variation in combustion pressure work also becomes larger as the air-fuel ratio becomes leaner; however, the magnitude of the variation for the case when the ignition timing is retarded is larger than the variation in in-cylinder pressure for the case when the ignition timing is not retarded.

This is attributed to the phenomenon illustrated in FIG. 30. In other words, when the ignition timing is retarded, the range of the variation in combustion pressure moves to the retard side, resulting in a large effect of ΔV being imposed, and thus, from the perspective of combustion pressure work, larger variation can be seen.

The above is a description of the mechanism of the engine (combustion) becoming unstable when the ignition timing is retarded.

As illustrated in FIG. 25, a similar phenomenon occurs when the air-fuel ratio is made to be lean; however, when the air-fuel ratio is made to be lean, the region of generation of combustion pressure merely reaches the region in which ΔV is large, as a result of delay in combustion velocity. Accordingly, the variation in combustion pressure in the region in which ΔV is large is relatively small, and the degree of the effect of the variation on the combustion pressure work is relatively small. Meanwhile, when the ignition timing is retarded, the ignition timing moves to the region in which ΔV is large, and thus, most of the time during which combustion pressure is generated is in the region in which ΔV is large. Accordingly, variation in combustion pressure in the region in which ΔV is large becomes large, and the degree of the effect of the variation on the combustion pressure work also becomes large.

From the above-described circumstances, a larger effect of ΔV is imposed in the case where the ignition timing is retarded, compared to the case where the air-fuel ratio is lean, and thus, where the in-cylinder pressure (combustion pressure) varies, the stability deteriorates worse (i.e., the variation in the combustion pressure work becomes larger). Accordingly, the present inventors have believed that in the environment of practical use, the stability almost inevitably deteriorates from the stability when the ignition timing is retarded.

As illustrated in FIG. 19, an HC reduction effect can be obtained by even merely making the air-fuel ratio be lean (controlling it to be a range of 15 to 16) without retarding the ignition timing. In addition, in order to maximum the effect of retarding, it is necessary to make the air-fuel ratio be lean.

From the above-described knowledge, the inventors have reached the conclusion that when on-board control of the air-fuel ratio and the ignition timing from the "set value for securing a margin for stability" to the "condition for minimizing the HC concentration", which are illustrated in FIG. 20 is performed, a control method enabling the robustness to be secured while minimizing HC is: first making the air-fuel ratio be lean, which "relatively hardly causes deterioration in the stability", enables an "HC reduction effect to be obtained solely (without retarding the ignition timing", and also enables "the maximum effect of retarding to be obtained", and then, retarding the ignition timing, which easily causes deterioration in the stability.

The present invention has been made based on the above-described knowledge and study, and a first aspect of an engine controller according to the present invention essentially comprises: air-fuel ratio control means for controlling an air-fuel ratio to be within a predetermined range when an engine is operated at a certain driving condition; and ignition timing correction means for correcting ignition timing to a retard side when the engine is operated at the certain driving condition and the air-fuel ratio is within the predetermined range (see FIG. 1).

In other words, as described above (with reference to FIG. 19 or 20), in order to minimize the HC concentration in exhaust from an engine, it is most effective to make the air-fuel ratio be in a range of 15 to 16, and also retarding the ignition timing. Meanwhile, as described above, in the environment of practical use, the stability almost inevitably deteriorates from the stability when the ignition timing is retarded. From the above-mentioned circumstances, when on-board control of the air-fuel ratio and the ignition timing from the set values for securing a margin for stability to the condition for minimizing the HC concentration, which are illustrated in FIG. 20, is performed, a method enabling provision of high robustness and stability, and also enabling HC to be minimized is first making the air-fuel ratio be lean (i.e., controlling the air-fuel ratio to be within a predetermined range), which relatively hardly causes deterioration in stability, and then retarding the ignition timing, which easily causes deterioration in stability.

In a second aspect of the engine controller according to the present invention, the predetermined range of the air-fuel ratio controlled by the air-fuel ratio control means is set from 14.5 to 16.5 (see FIG. 2).

In other words, the predetermined range of the air-fuel ratio stated in the first aspect is quantitatively clarified. As described above, it is desirable that the air-fuel ratio be in a range of 15 to 16; however, from FIG. 20, a sufficient HC reduction effect can be obtained if the air-fuel ratio is within a range of 14.5 to 16.5, which is figured out taking control performance variation in the environment of practical use into consideration.

A third aspect the engine controller according to the present invention comprises: air-fuel ratio detection means for directly or indirectly detecting the air-fuel ratio; and degree of stability detection means for directly or indirectly detecting degree of stability of the engine, and the air-fuel ratio control means performs the control based on the detected air-fuel ratio, and the ignition timing correction means performs the correction based on the detected degree of stability (see FIG. 3).

In other words, as described above, in order to minimize the HC concentration in exhaust from an engine, it is most effective to make the air-fuel ratio be in a range of 15 to 16 and also retarding the ignition timing. In order to perform on-board control of the air-fuel ratio, means for detecting an air-fuel ratio is provided. Also, it is desirable that the ignition timing is retarded to the maximum extent possible until the limit of stability determined by respective standards is reached. For that purpose, means for detecting degree of stability is provided.

In a fourth aspect of the engine controller according to the present invention, the ignition timing correction means corrects the ignition timing to the retard side based on the detected degree of stability after the air-fuel ratio is controlled by the air-fuel ratio control means to be within the predetermined range (see FIG. 4).

In other words, as described above, in order to minimize the HC concentration in exhaust from an engine, it is more effective to make the air-fuel ratio be in a range of 15 to 16 and also retarding the ignition timing. The engine controller further includes the means for detecting an air-fuel ratio and the means for detecting degree of stability, which are stated in the third aspect, and the air-fuel ratio is controlled to be within a predetermined range (desirably from 15 to 16) based on the detected air-fuel ratio, and if the air-fuel ratio is determined as being within the predetermined range, the ignition timing is retarded to a predetermined limit of stability based on the detected degree of stability.

In a fifth aspect of the engine controller according to the present invention, an air-fuel ratio sensor, an oxygen sensor or a sensor that detects another exhaust component, arranged in an exhaust passageway, is used as the air-fuel ratio detection means (see FIG. 5).

In other words, the use of an air-fuel ratio sensor or oxygen sensor for detecting, e.g., an oxygen concentration in an exhaust gas or a sensor for detecting another exhaust component, as the air-fuel ratio detection means is clarified.

In a sixth aspect of the engine controller according to the present invention, the air-fuel ratio detection means detects the air-fuel ratio based on in-cylinder pressure variation and/or engine speed variation (see FIGS. 6 and 7).

In other words, as illustrated in FIG. 21, when the air-fuel ratio is made to be lean, the combustion stability deteriorates. In general, the degree of stability of combustion indicates the degree of cyclic variation in in-cylinder pressure, that is, in-cylinder pressure variation. Also, because of the structure of an engine, variation of in-cylinder pressure emerges also in engine speed variation. Accordingly, an air-fuel ratio can be detected from in-cylinder pressure variation or/and engine speed variation. This is clarified by the sixth aspect.

In a seventh aspect of the engine controller according to the present invention, the degree of stability detection means detects the degree of stability based on the in-cylinder pressure variation and/or the engine speed variation (see FIGS. 8 and 9).

In other words, as mentioned in the description of the sixth aspect, in general, the degree of stability of combustion indicates the degree of cyclic variation in in-cylinder pressure, that is, in-cylinder pressure variation. Also, because of the structure of an engine, variation in in-cylinder pressure emerges also in engine speed variation. This is clarified by the seventh aspect.

In an eighth aspect of the engine controller according to the present invention, the air-fuel ratio detection means and/or the degree of stability detection means calculates an n-th order derivative component (n=1, 2 . . . ) of a rotation speed of the engine, as the engine speed variation (see FIG. 10).

In other words, there is a substantially linear relationship or high correlation between in-cylinder pressure variation and engine torque variation. Furthermore, there is also a substantially linear relationship or high correlation between engine torque variation and engine rotational angle acceleration. Furthermore, when differentiating an angular acceleration, an effect can be obtained for robustness against drift noise and enhancement of S/N during transient driving since differentiation processing provides the effect of allowing high-frequency components to pass through and blocking low-frequency components. This is clarified by the eighth aspect.

A ninth aspect of the engine controller according to the present invention comprises: engine speed variation detection means for detecting the engine speed variation as the air-fuel ratio detection means and the degree of stability detection means; and switching means for selectively switching between the control performed by the air-fuel ratio control means based on the engine speed variation detected by the engine speed variation detection means and the correction made by the ignition timing correction means based on the engine speed variation (see FIG. 11).

In other words, although the air-fuel ratio and the ignition timing are both controlled based on engine speed variation, the control of the air-fuel ratio and the ignition timing based on engine speed variation is not performed simultaneously, and switching means is provided.

In a tenth aspect of the engine controller according to the present invention, the switching means makes the air-fuel ratio control means perform the control to control the air air-fuel ratio to be within the predetermined range, and then makes the ignition timing correction means make the correction (see FIG. 12).

In other words, in the controller according to the ninth aspect, the switching means functions so as to first control the air-fuel ratio to be within a predetermined range (desirably from 15 to 16) based on engine speed variation, and then control (correct) the ignition timing to the retard side based on the engine speed variation. This is clarified by the tenth aspect.

In an eleventh aspect of the engine controller according to the present invention, the air-fuel ratio control means keeps an air-fuel ratio control parameter so that the air-fuel ratio is maintained within the predetermined range after the air-fuel ratio is controlled to be within the predetermined range based on the engine speed variation, and the ignition timing correction means corrects the ignition timing to a retard side based on the engine speed variation when the air-fuel ratio is maintained within the predetermined range (see FIG. 13).

In other words, the eleventh aspect more exactly specifies an operation (control sequence) of the controller according to the ninth and tenth aspects.

In a twelfth aspect of the engine controller according to the present invention, the air-fuel ratio control means, when the engine speed variation is smaller than a predetermined range A, makes correction to decrease a fuel injection amount until the engine speed variation reaches within the predetermined range A, when the engine speed variation is larger than the predetermined range A, makes correction to increase the fuel injection amount until the engine speed variation reaches within the predetermined range A, and when the engine speed variation is within the predetermined range A, keeps the correction value for the fuel injection amount; and after the air-fuel ratio control means keeps the correction amount for the fuel injection amount, the ignition timing correction means, when the engine speed variation is smaller than a predetermined range B, corrects the ignition timing to the retard side until the engine speed variation reaches within the predetermined range B, when the engine speed variation is larger than the predetermined range B, corrects the ignition timing to an advance side until the engine speed variation reaches within the predetermined range B, and when the engine speed variation is within the predetermined range B, stops revision of the correction of the ignition timing and keeps the correction value (see FIG. 14).

This aspect is provided to more specifically describe the controller according to the ninth to eleventh aspects. In other words, the range of engine speed variation corresponding to a target range of the air-fuel ratio is determined as a predetermined range A. It is desirable that the predetermined range A be engine speed variation corresponding to an air-fuel ratio of 15 to 16. The fuel injection amount is corrected (the air-fuel ratio is adjusted) so that the engine speed variation reaches within the predetermined range A. When the engine speed variation is larger than the predetermined range A, the air-fuel ratio is determined as being on the lean side relative the target range, and correction is made to increase the fuel injection amount. When the engine speed variation is smaller than the predetermined range A, the air-fuel ratio is determined as being on the rich side relative to the target range, and correction is made to decrease the fuel injection amount. When the engine speed variation is within the predetermined range A, the control of the air-fuel ratio within the target range is determined as having been completed, and the correction of the fuel injection amount based on the engine speed variation is stopped, and the control is switched to the control for retarding the ignition timing based on the engine speed variation.

Meanwhile, the range of engine speed variation corresponding to the limit of stability is determined as a predetermined range B. The ignition timing is corrected (the retarding amount is adjusted) so that the engine speed variation reaches within the predetermined range B. When the engine speed variation is larger than the predetermined range B, the stability is determined as deteriorating worse than the limit of stability, and the ignition timing is corrected to the advance side. When the engine speed variation is smaller than the predetermined range B, it is determined that there is a margin relative to the limit of stability, and the ignition timing is corrected to the retard side. When the engine speed variation is within the predetermined range B, the control of the ignition timing to the limit of stability is determined as having been completed, and the correction of the ignition timing is stopped.

In a thirteenth aspect of the engine controller according to the present invention, the predetermined range A is set to be smaller than the predetermined range B (see FIG. 15).

In other words, as mentioned in the description of the twelfth aspect, the predetermined range A indicates the target range of the air-fuel ratio. After the air-fuel ratio falling within the predetermined range A (after controlling the air-fuel ratio to be within the target range, the control for retarding the ignition timing is performed. As a result f the retarding, the stability (engine speed variation) deteriorates. Accordingly, it is necessary to set the predetermined range A to be smaller (lower) than the predetermined range B. As mentioned also in the description of the twelfth aspect, it is desirable to set the predetermined range B near the limit of stability.

A fourteenth aspect of the engine controller according to the present invention comprises means for prohibiting the ignition timing from being controlled to the retard side when the air-fuel ratio is not controlled to be within the predetermined range (see FIG. 16).

In other words, as illustrated in FIG. 19, in order to obtain an HC reduction effect by means of retarding the ignition timing, it is necessary to control the air-fuel ratio at least in a range of from 14.5 to 16.5. Even if the ignition timing is retarded when the air-fuel ratio is not controlled within this range, only a small HC reduction effect can be obtained, while the stability largely deteriorates as a resulting the retarding as described above. Accordingly, the fourteenth aspect includes means for prohibiting the ignition timing from being controlled to the retard side when the air-fuel ratio is not controlled within the predetermined range (14.5 to 16.5).

A fifteenth aspect of the engine controller according to the present invention comprises means for, when the air-fuel ratio is not controlled to be within the predetermined range, if the ignition timing is on the retard side relative to a predetermined value, first making the ignition timing correction means perform an operation to bring the ignition timing back to the advance side, and then making the air-fuel ratio control means perform an operation to control the air-fuel ratio to be within the predetermined range (see FIG. 17).

In other words, as mentioned in the description of the fourteenth aspect, in order to obtain an HC reduction effect by means of retarding the ignition timing, it is at least necessary to control the air-fuel ratio within a range of 14.5 to 16.5. Even if the ignition timing is retarded when the air-fuel ratio is not controlled within this range, only a small HC reduction effect can be obtained, and the stability largely deteriorates as a result of the retarding. Meanwhile, there remains room for reducing HC by controlling the air-fuel ratio to be within a range of 15 to 16. Therefore, when the air-fuel ratio is not controlled to be within a predetermined range (14.5 to 16.5), if the ignition timing is on the retard side relative to a predetermined value, HC is reduced by first bringing the ignition timing back to the advance side to secure the stability and after bringing the ignition timing to the advance side, controlling the air-fuel ratio to be within the aforementioned predetermined range (14.5 to 16.5).

In a sixteenth aspect of the engine controller according to the present invention, the air-fuel ratio control means and the ignition timing correction means, when a temperature of a catalyst provided in the exhaust passageway has no more than a predetermined value or the catalyst's purification efficiency has no more than a predetermined value, perform the control and the correction (see FIG. 18).

In other words, the sixteenth aspect clearly indicates "when a temperature of a catalyst has no more than a predetermined value or the catalyst's purification efficiency has no more than a predetermined value" as a representative example of the statement in the first aspect, "when the engine is operated at a certain driving condition". As described above, after activation of the catalyst, it is favorable to control the air-fuel ratio to be the stoichiometry in order to highly efficiently purify HC emitted from the engine, by means of the catalyst. Accordingly, it is recommendable that the control according to the first to fifteenth aspects is performed when the temperature of the catalyst is no higher than a predetermined value or the purification efficiency is no higher than a predetermined value, which means a state before activation of the catalyst.

The engine controller according to the present invention can be controlled and corrected from any air-fuel ratio and any ignition timing; and accordingly, even though the initial settings are made so that the air-fuel ratio is made to be lean relative to the stoichiometry and the ignition timing is retarded relative to MBT, the aforementioned control and correction are performed from those set values, allowing a further HC reduction effect to be obtained.

According to the present invention, at the time of start-up of an engine (before activation of the catalyst), the air-fuel ratio and the ignition timing are consistently controlled so as to minimize the HC emissions while securing the robustness, according to various disturbances occurring in the environment of practical use. Accordingly, the HC emissions can substantially be reduced compared to the conventional settings of the air-fuel ratio and the ignition timing made taking the stability margin into consideration.

BRIEF DESCRIPTION OF THE DRAWINGS

FIG. 35 is a diagram provided for description of basic fuel injection amount calculation means in first, second and third examples.

FIG. 36 is a diagram provided for description of fuel injection amount correction permission means in a first example.

FIG. 37 is a diagram provided for description of fuel injection amount correction value calculation means in a first example.

DETAILED DESCRIPTION OF THE PREFERRED EMBODIMENTS

Hereinafter, an embodiment of an engine controller according to the present invention will be described with reference to the drawings.

Figure 1:
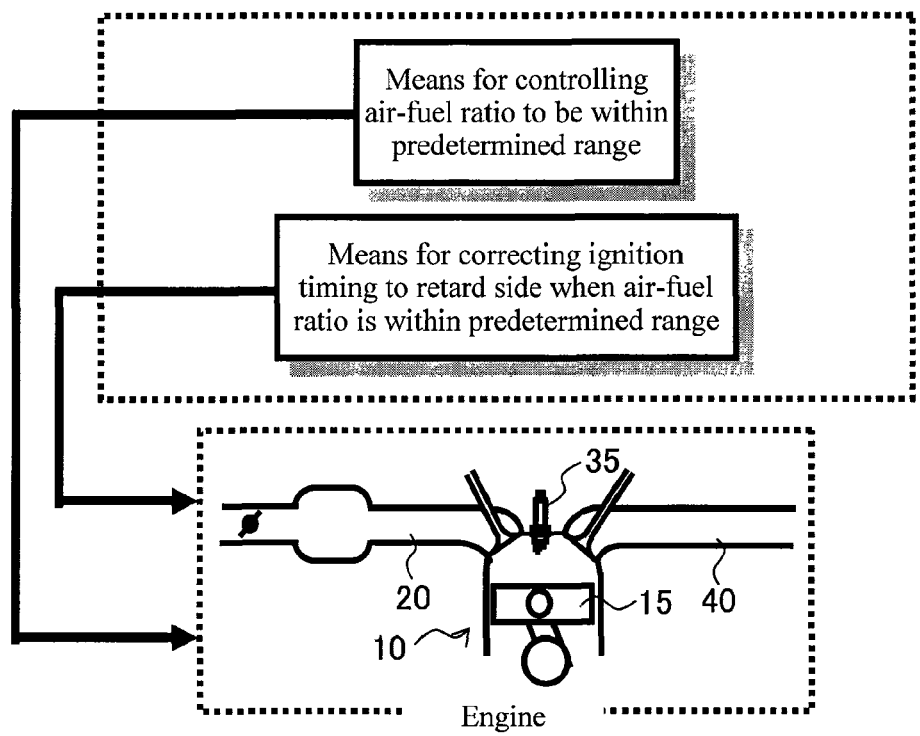
FIG. 1 is a diagram provided for description of a first aspect of a controller according to the present invention.
Figure 2:
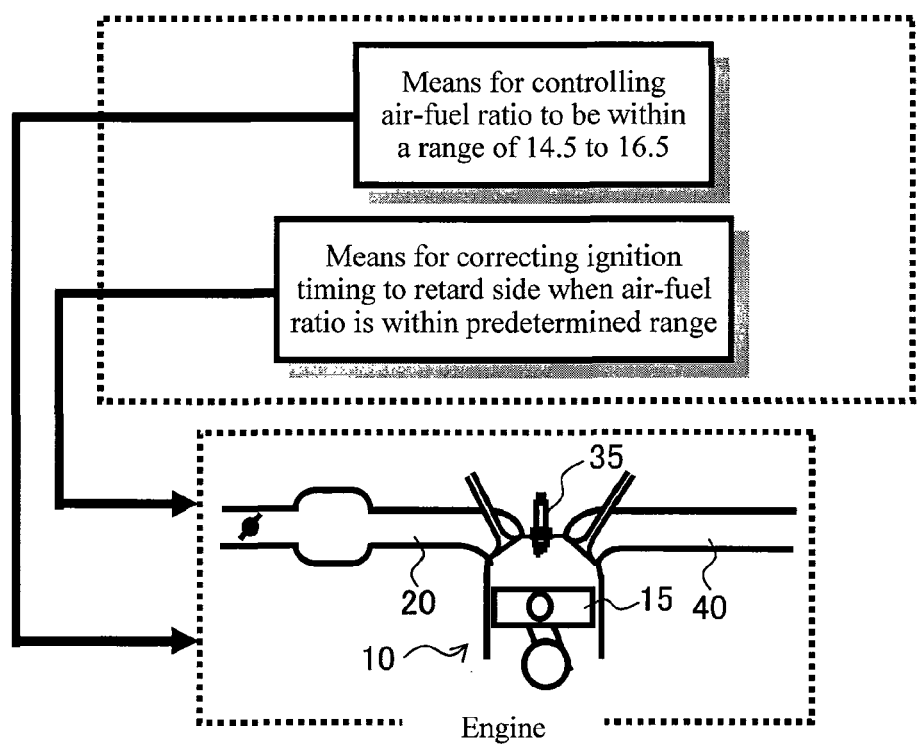
FIG. 2 is a diagram provided for description of a second aspect of a controller according to the present invention.
Figure 3:
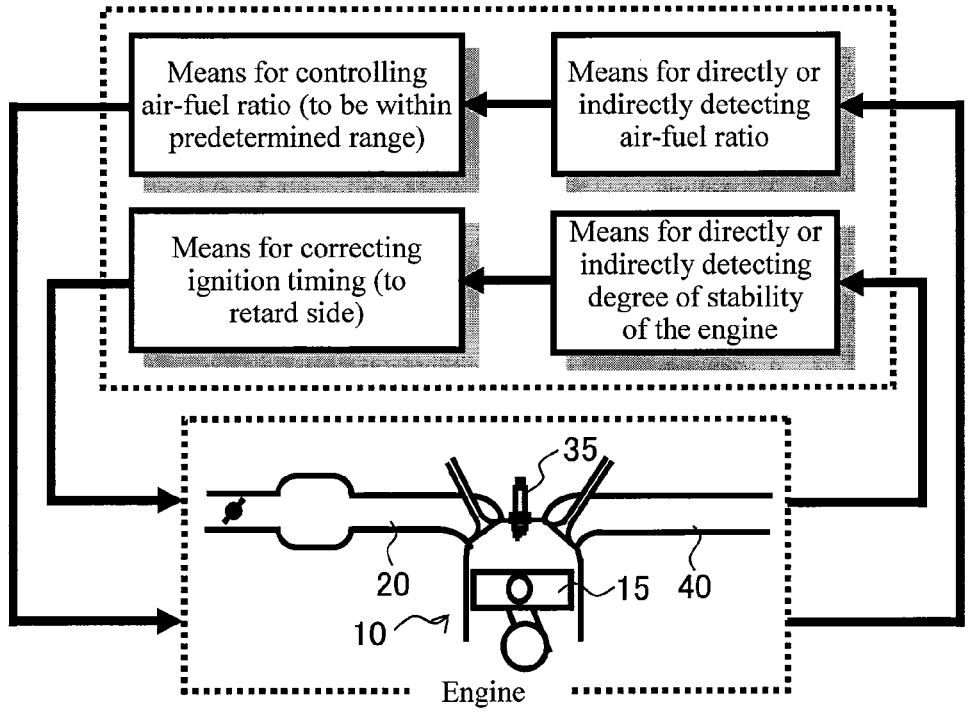
FIG. 3 is a diagram provided for description of a third aspect of a controller according to the present invention.
Figure 4:
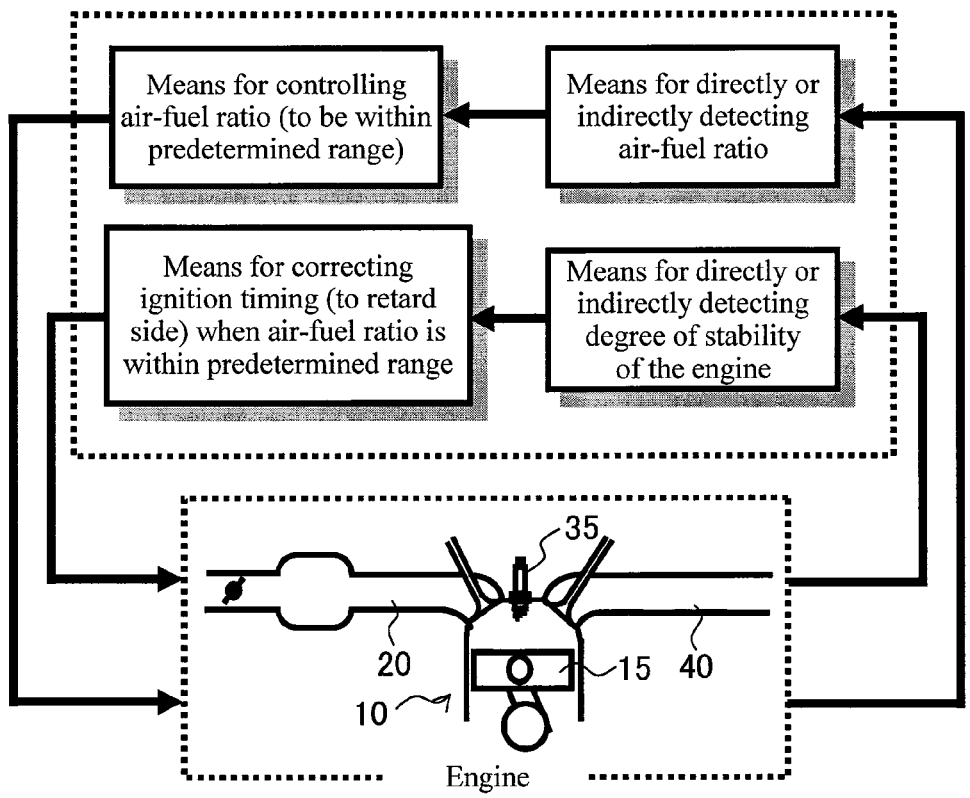
FIG. 4 is a diagram provided for description of a fourth aspect of a controller according to the present invention.
Figure 5:
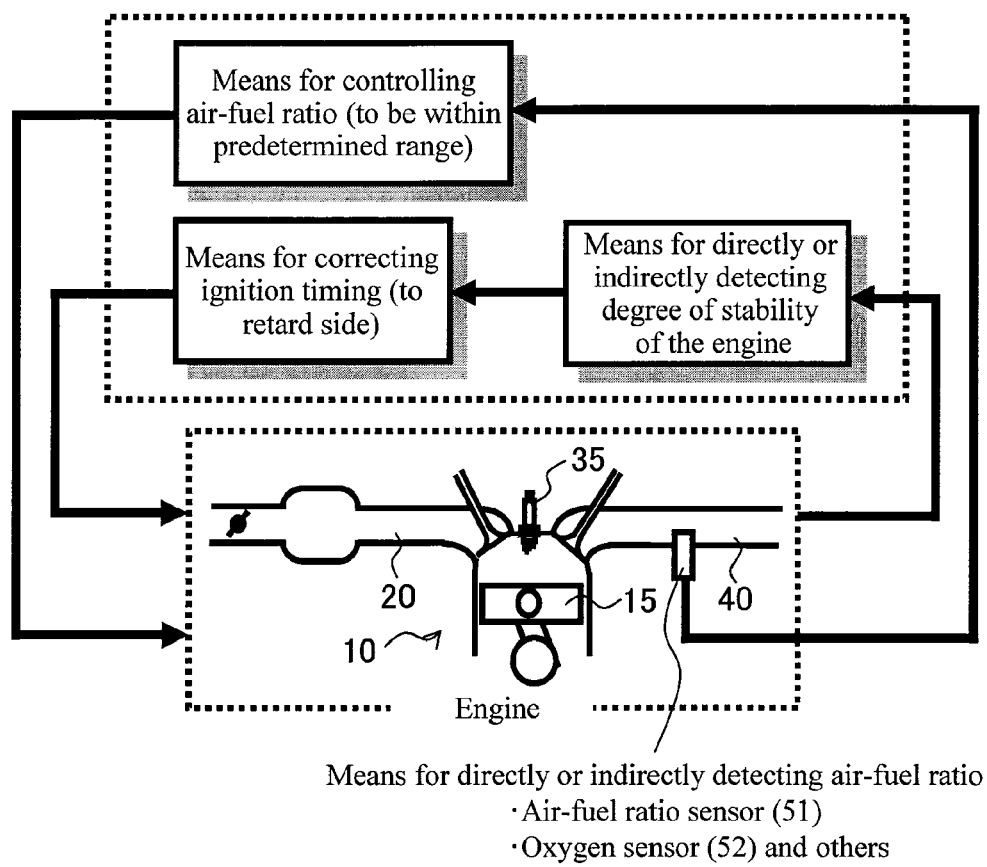
FIG. 5 is a diagram provided for description of a fifth aspect of a controller according to the present invention.
Figure 6:
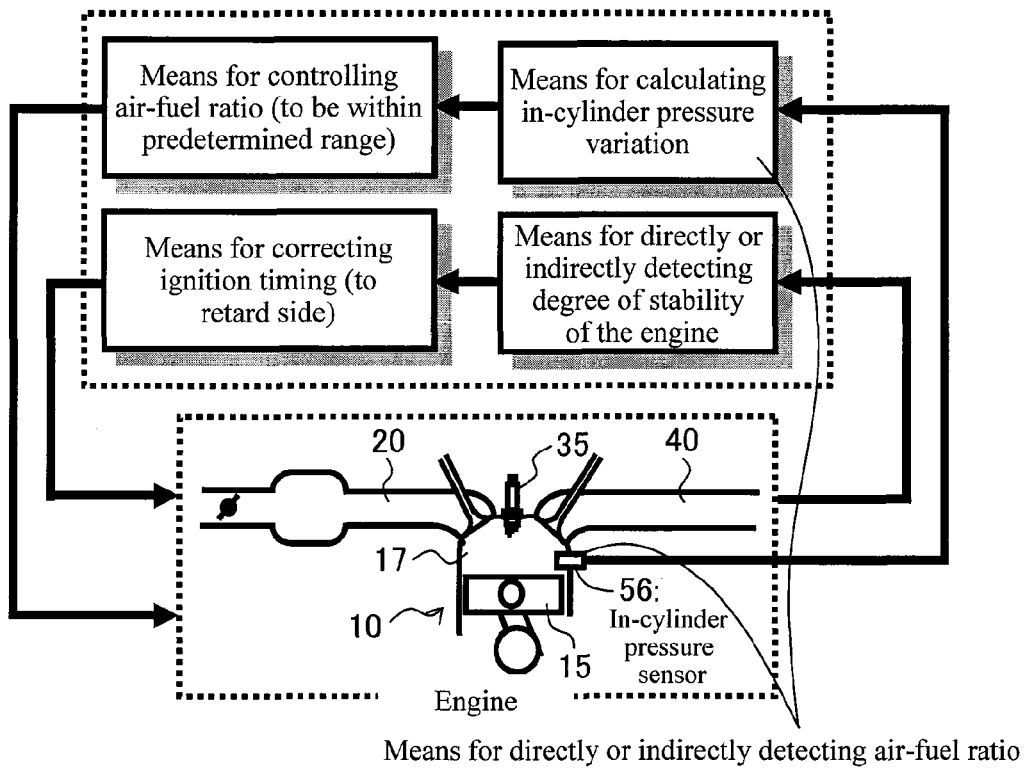
FIG. 6 is a diagram provided for description of a sixth aspect of a controller according to the present invention.
Figure 7:
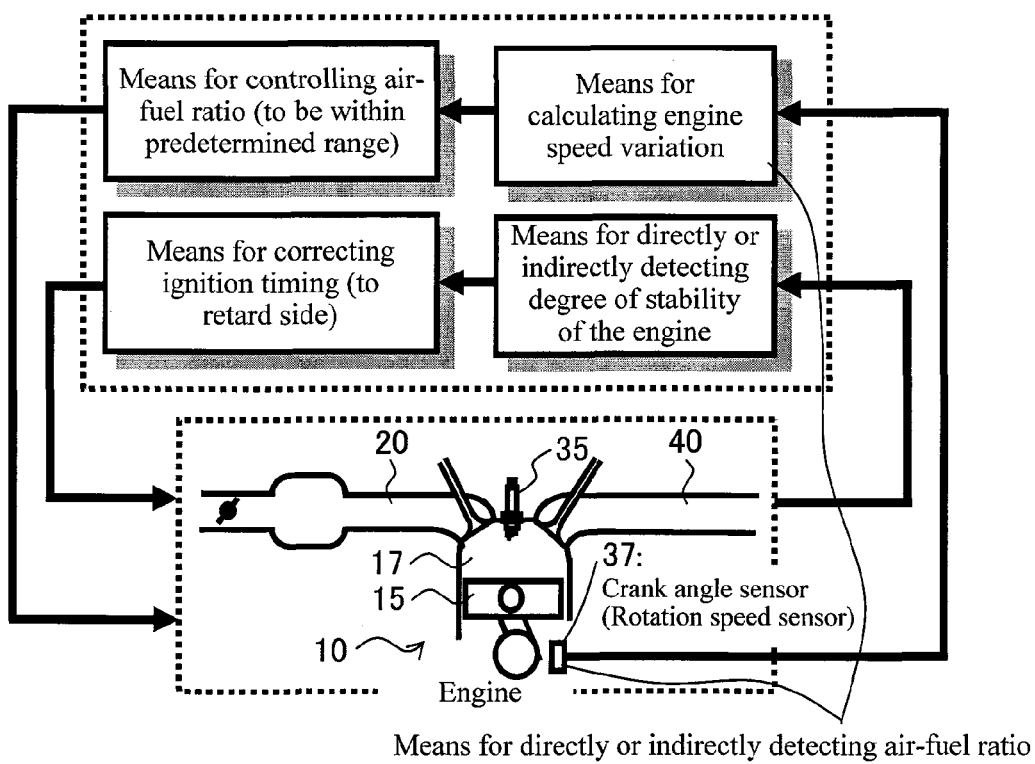
FIG. 7 is a diagram provided for description of a sixth aspect of a controller according to the present invention.
Figure 8:
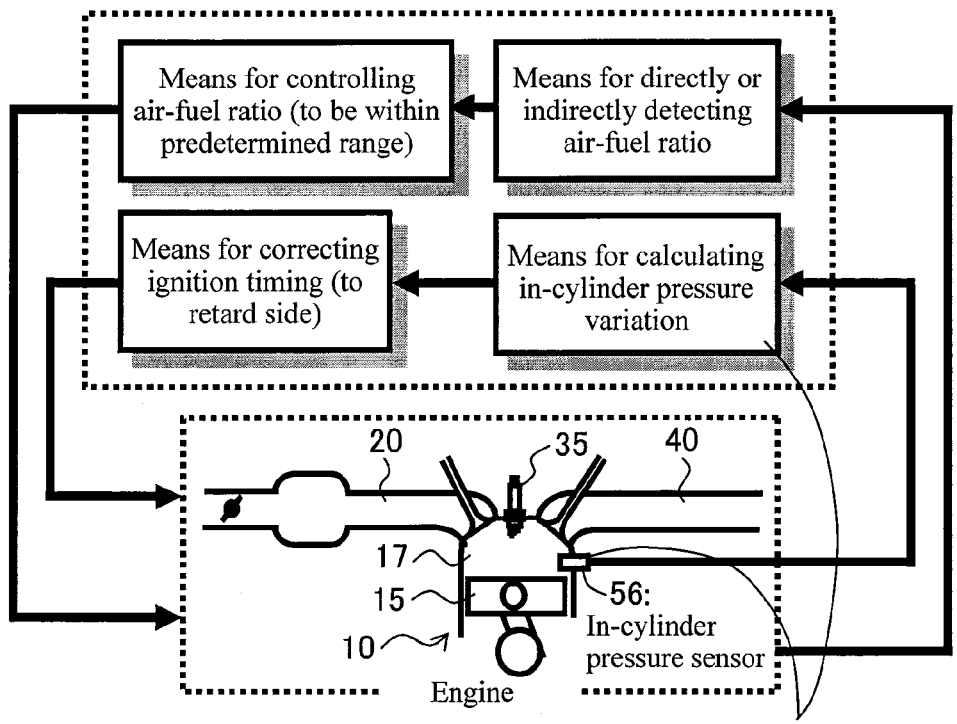
FIG. 8 is a diagram provided for description of a seventh aspect of a controller according to the present invention.
Figure 9:
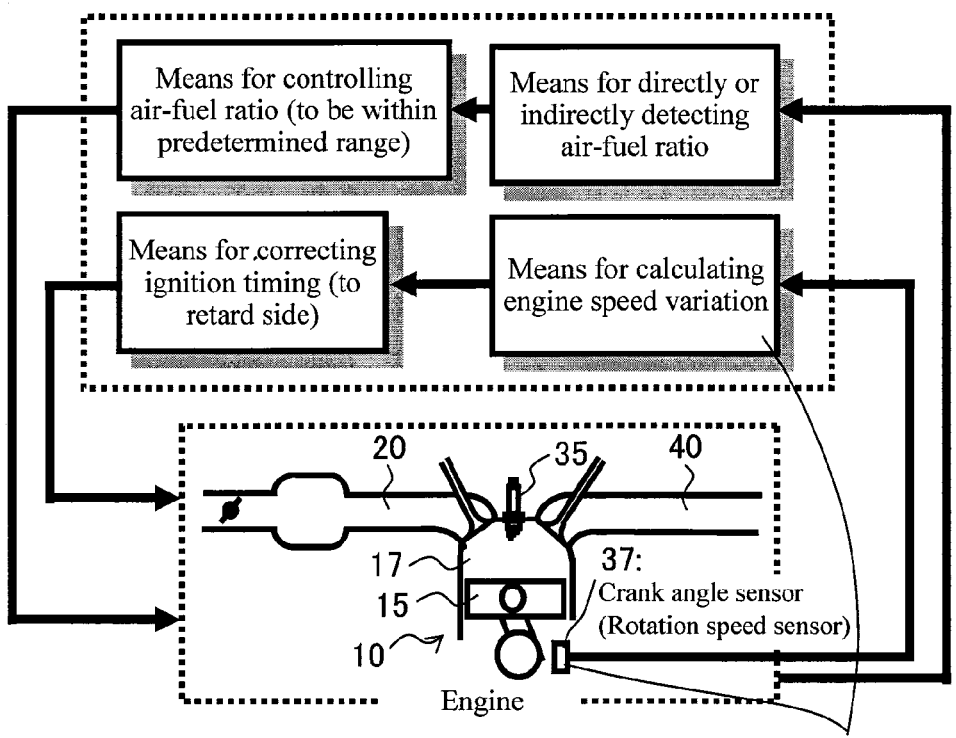
FIG. 9 is a diagram provided for description of a seventh aspect of a controller according to the present invention.
Figure 10:
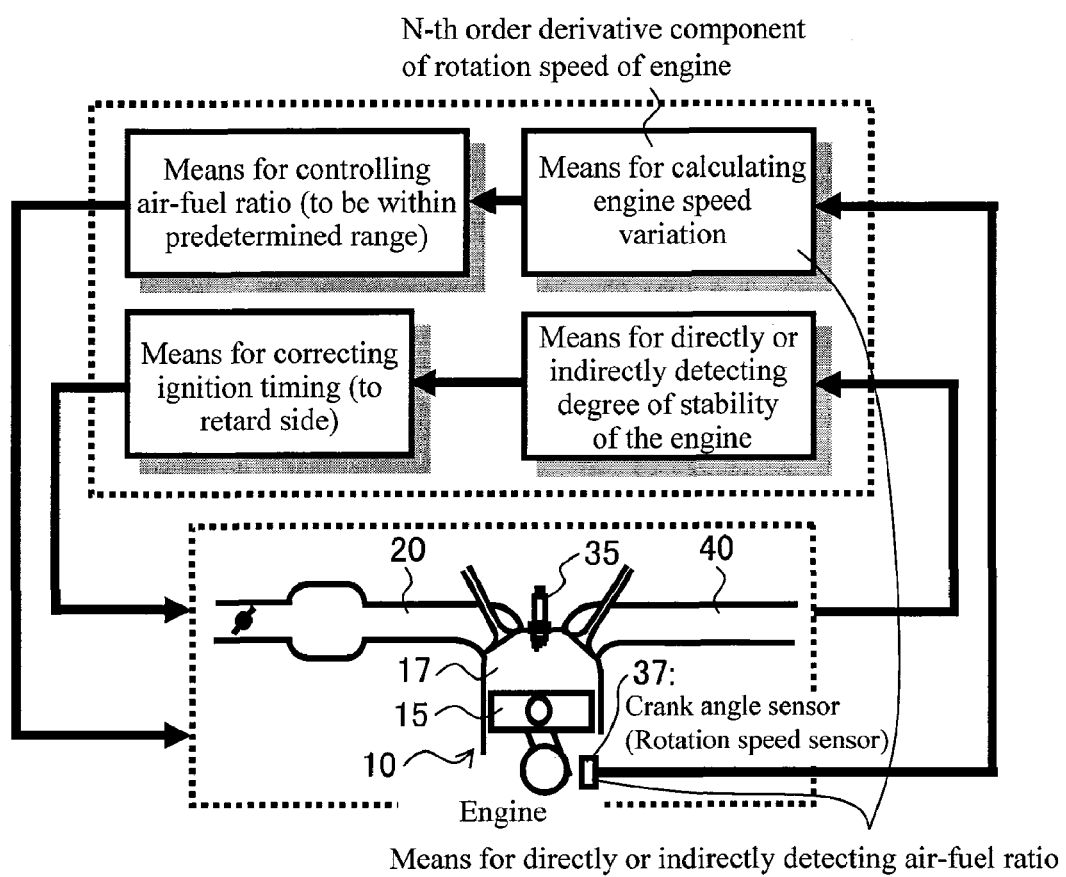
FIG. 10 is a diagram provided for description of an eighth aspect of a controller according to the present invention.
Figure 11:
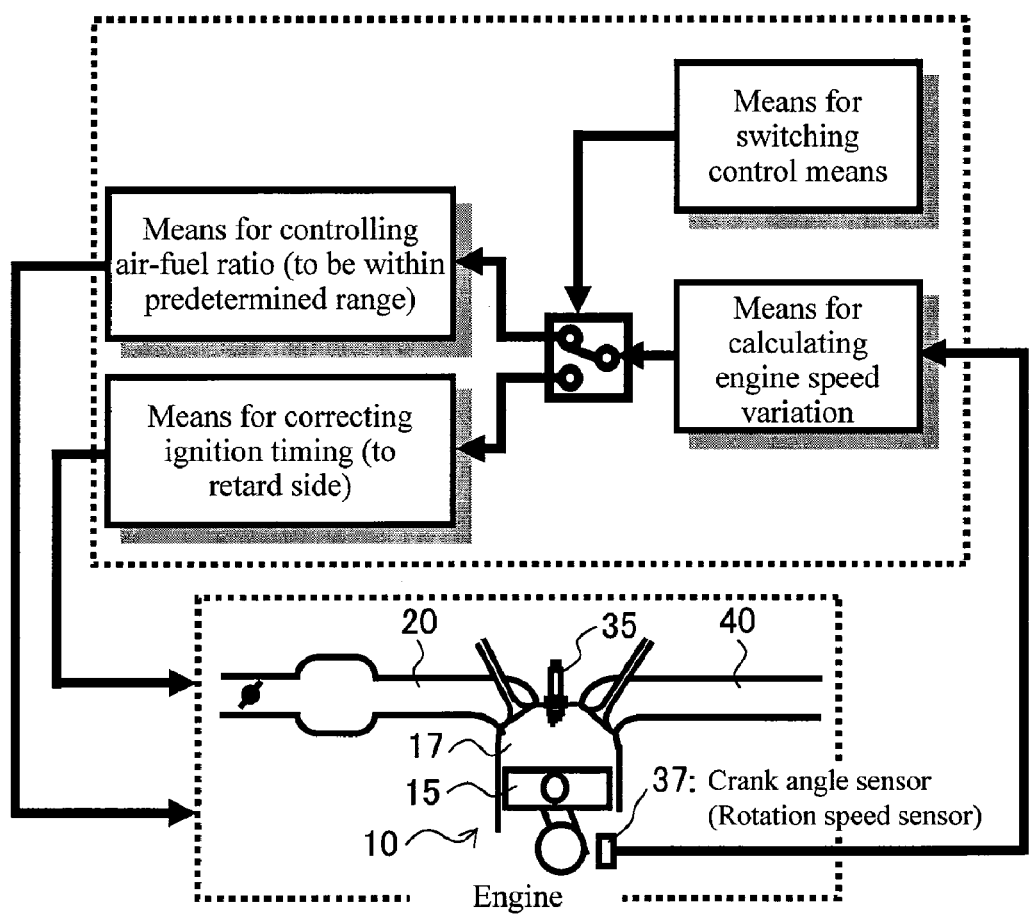
FIG. 11 is a diagram provided for description of a ninth aspect of a controller according to the present invention.
Figure 12:
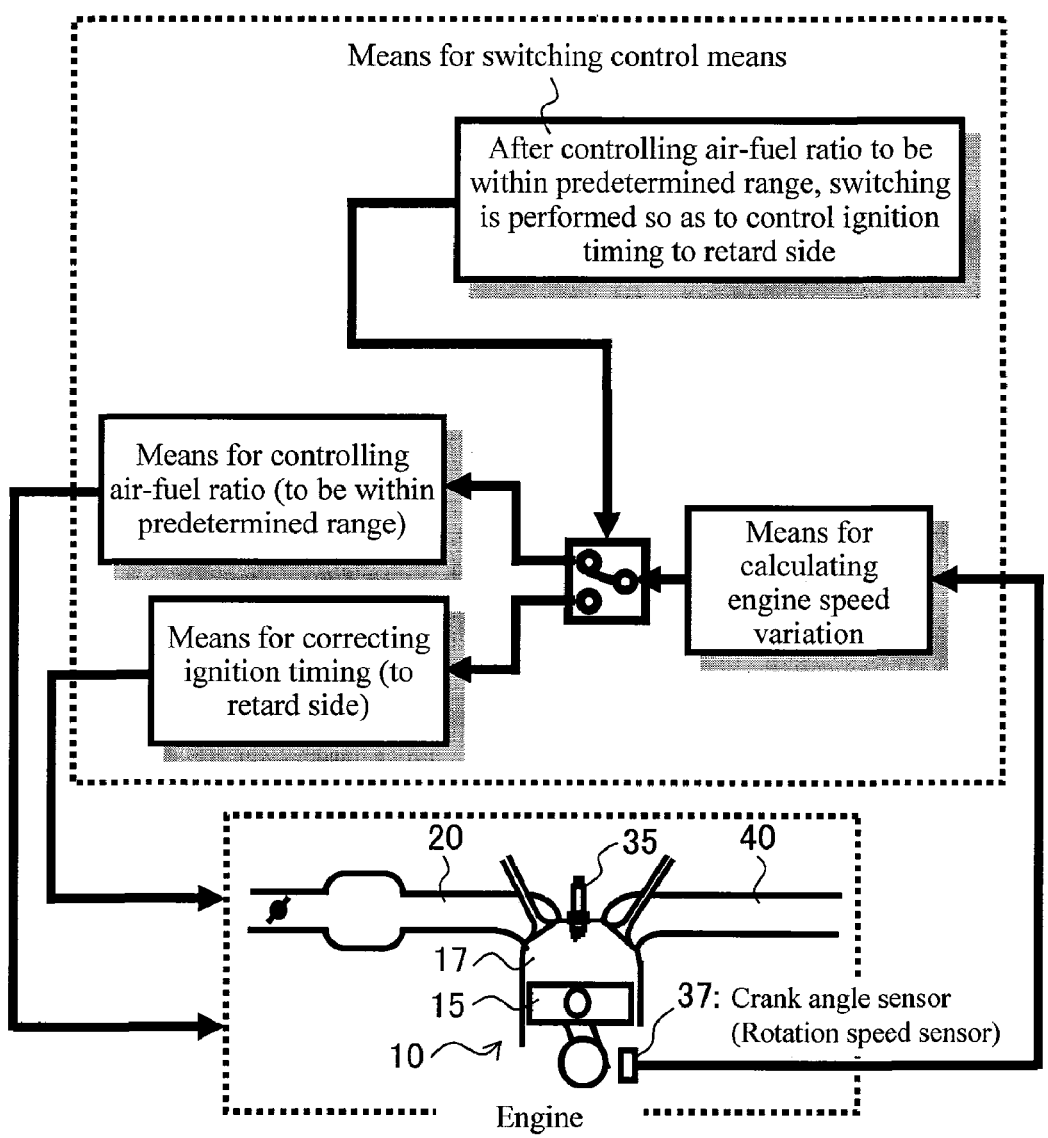
FIG. 12 is a diagram provided for description of a tenth aspect of a controller according to the present invention.
Figure 13:
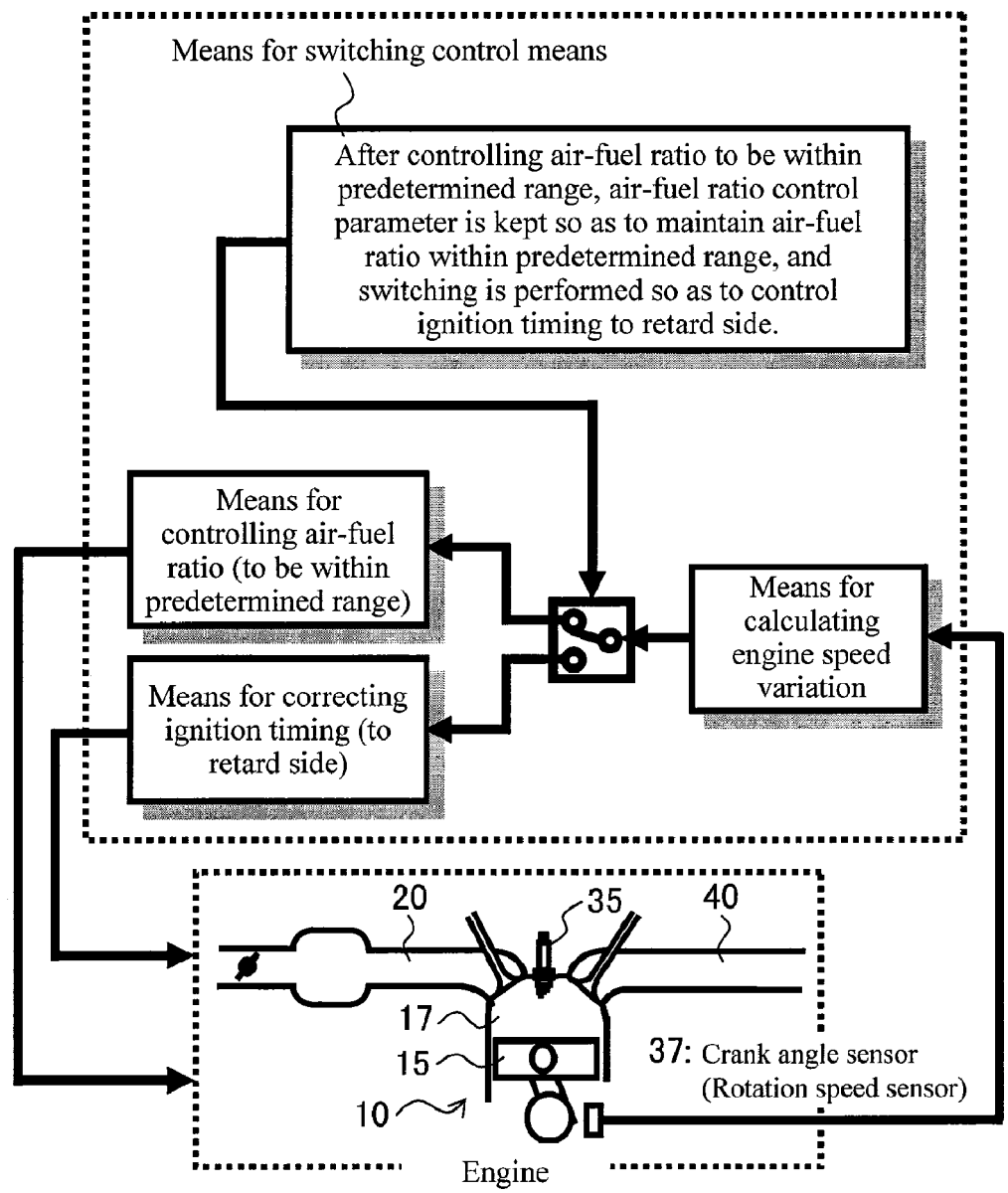
FIG. 13 is a diagram provided for description of an eleventh aspect of a controller according to the present invention.
Figure 14:
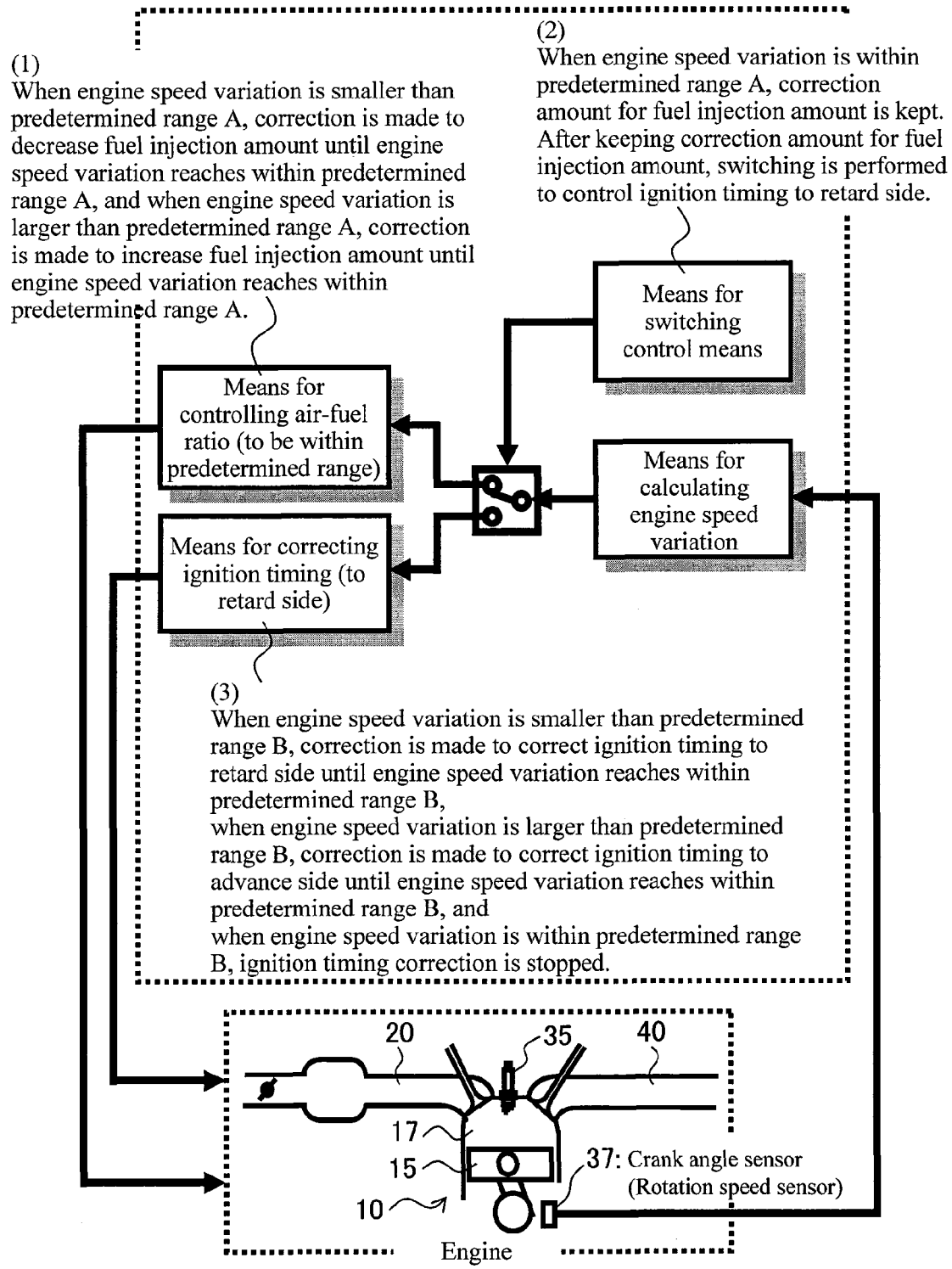
FIG. 14 is a diagram provided for description of a twelfth aspect of a controller according to the present invention.
Figure 15:
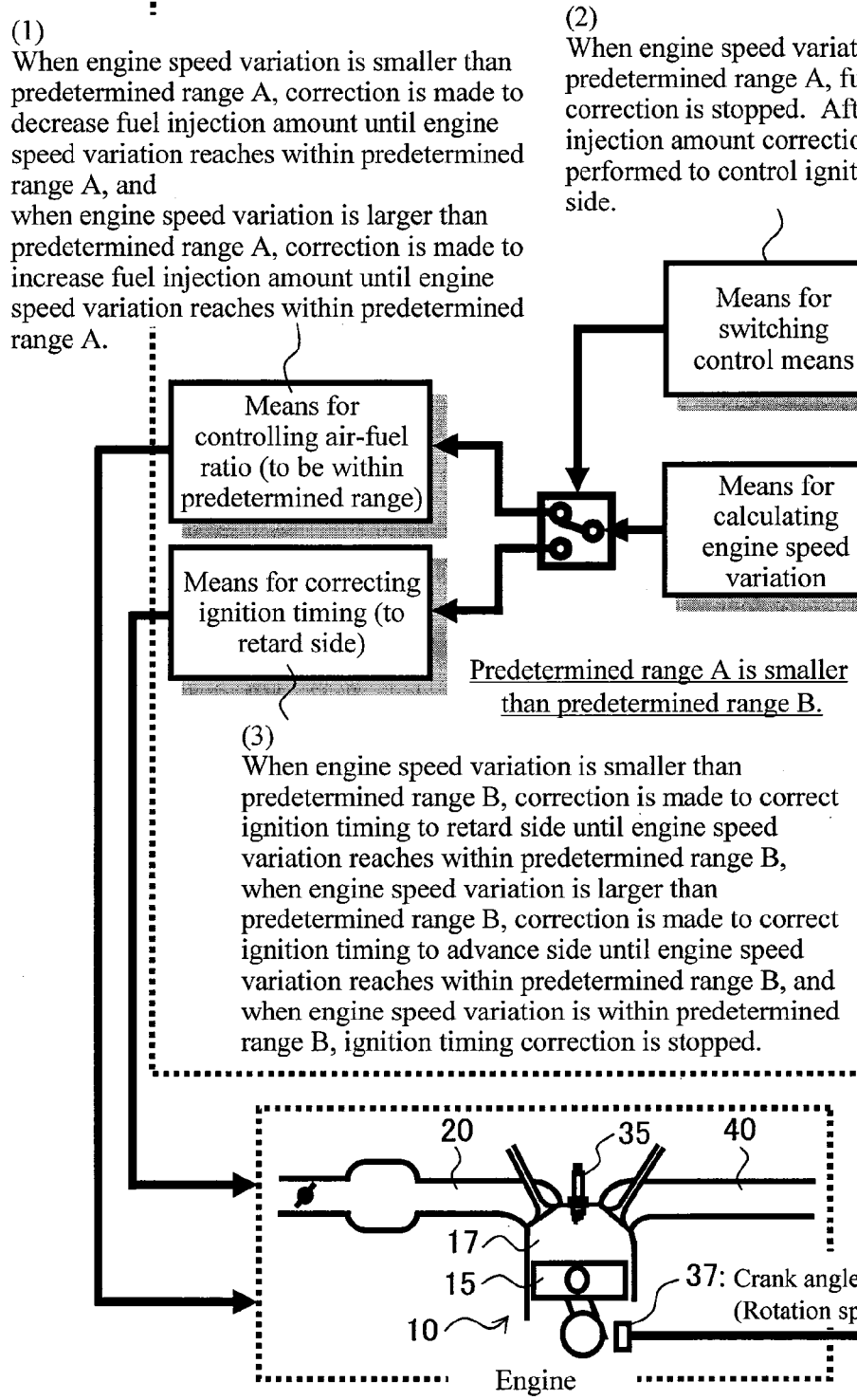
FIG. 15 is a diagram provided for description of a thirteenth aspect of a controller according to the present invention.
Figure 16:
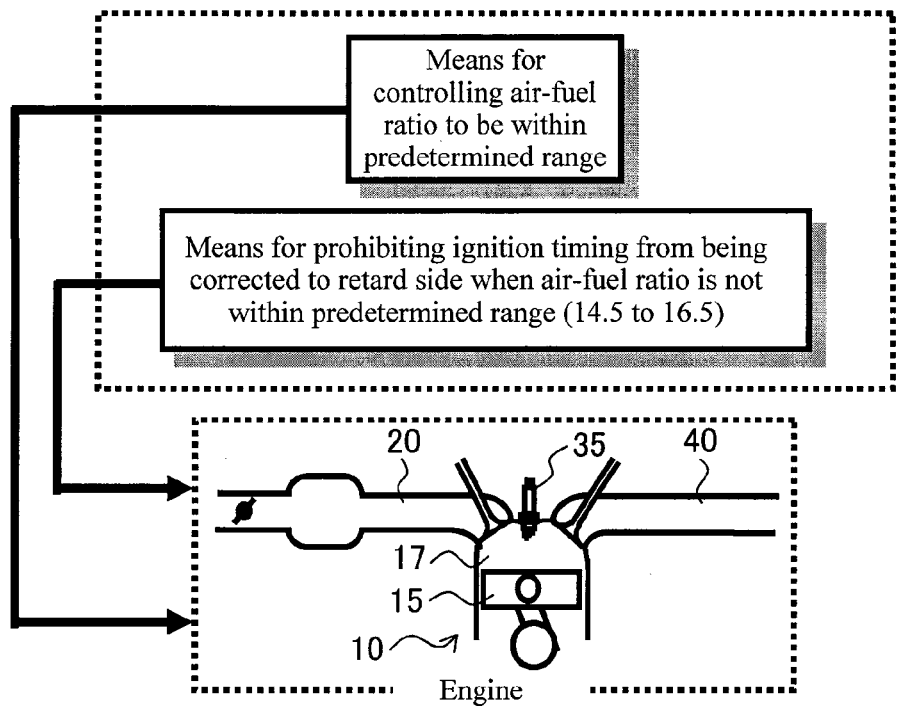
FIG. 16 is a diagram provided for description of a fourteenth aspect of a controller according to the present invention.
Figure 17:
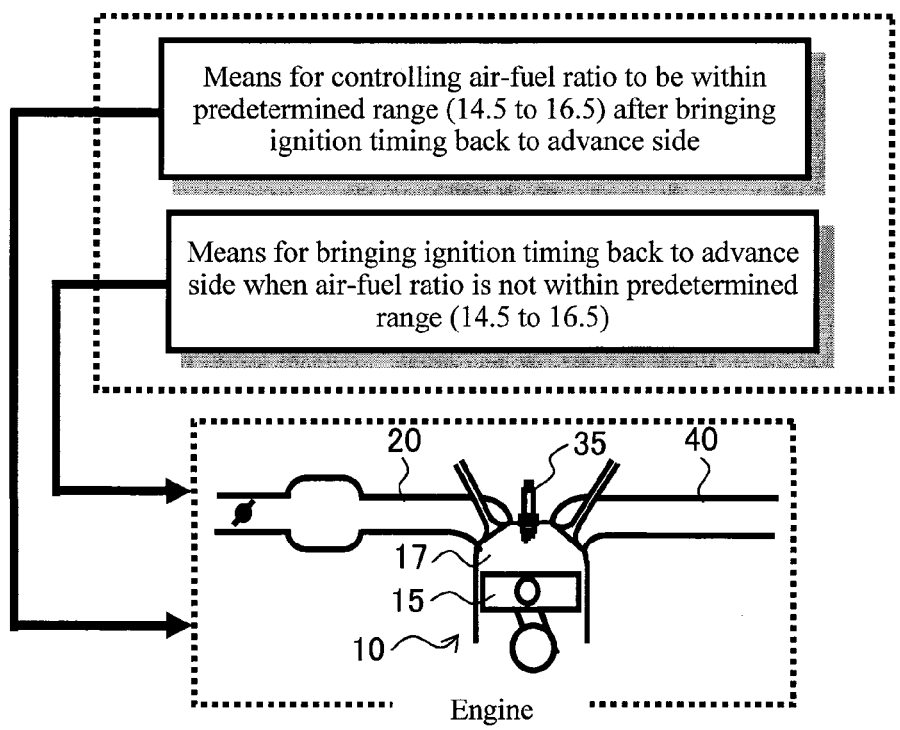
FIG. 17 is a diagram provided for description of a fifteenth aspect of a controller according to the present invention.
Figure 18:
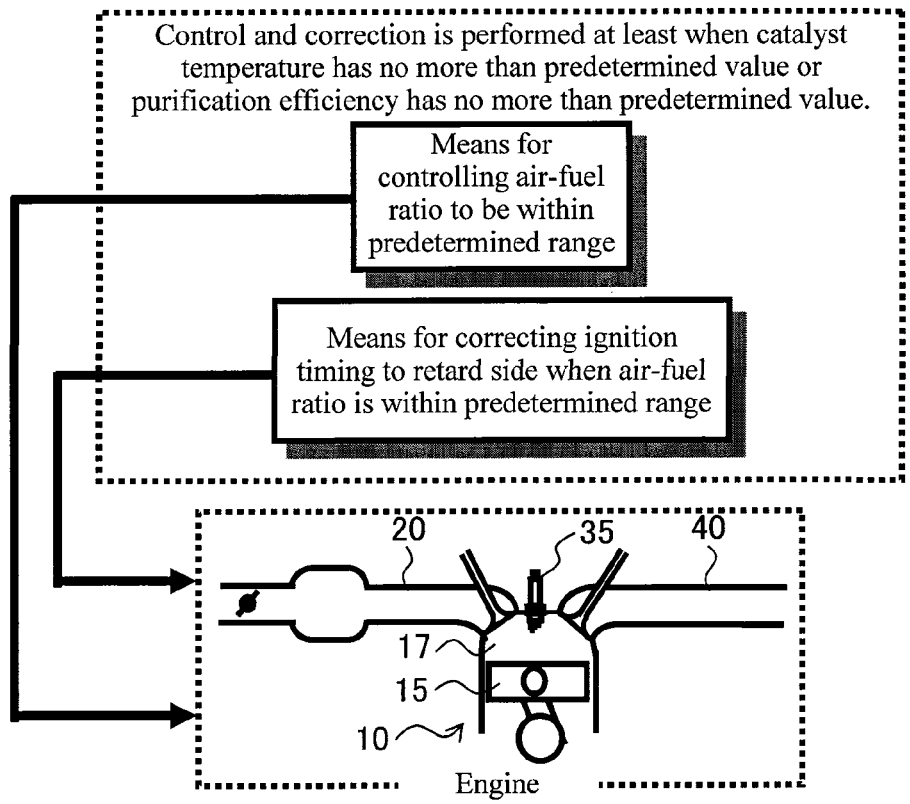
FIG. 18 is a diagram provided for description of a sixteenth aspect of a controller according to the present invention.
Figure 19:
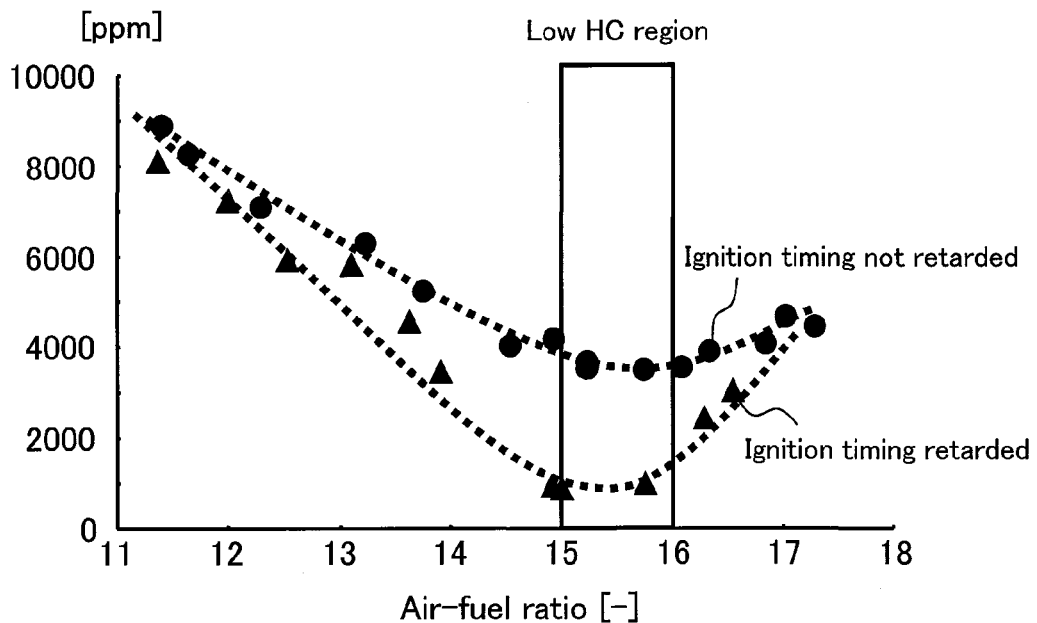
FIG. 19 is a diagram provided for description of the relationship between an air-fuel ratio and an HC concentration in exhaust.
Figure 20:
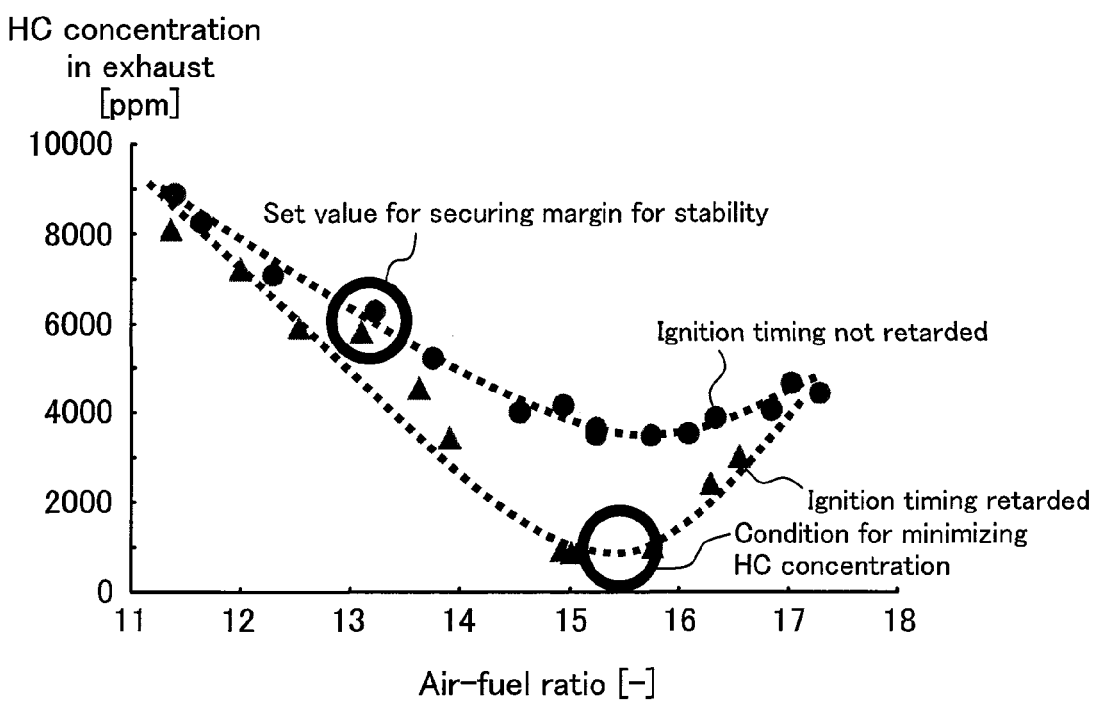
FIG. 20 is a diagram provided for description of a condition for minimizing HC and a set value for securing a margin for stability.
Figure 21:
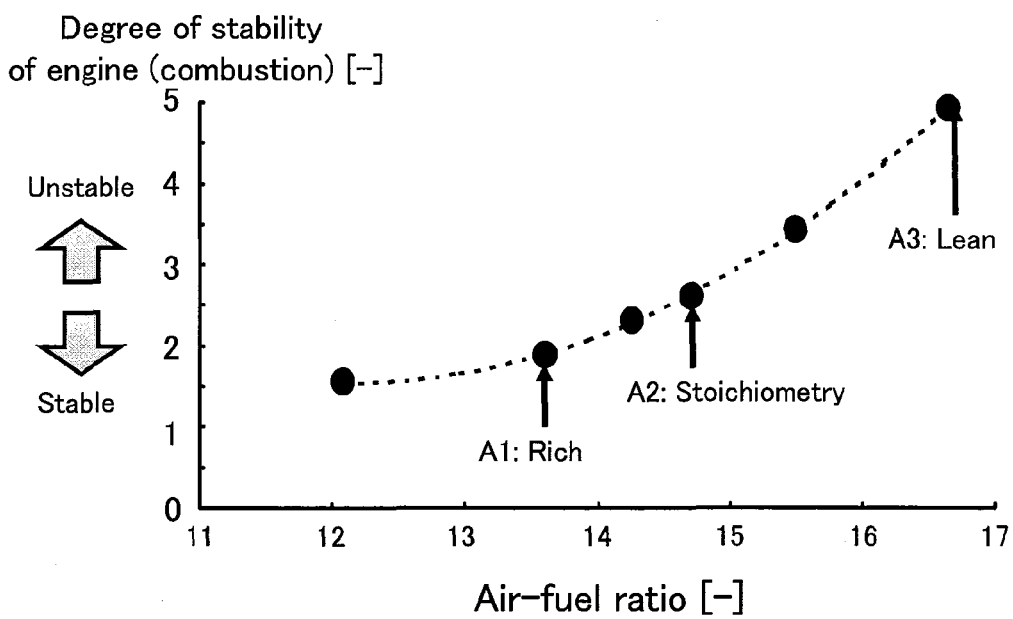
FIG. 21 is a diagram provided for description of characteristics of degree of stability relative to an air-fuel ratio.
Figure 22:
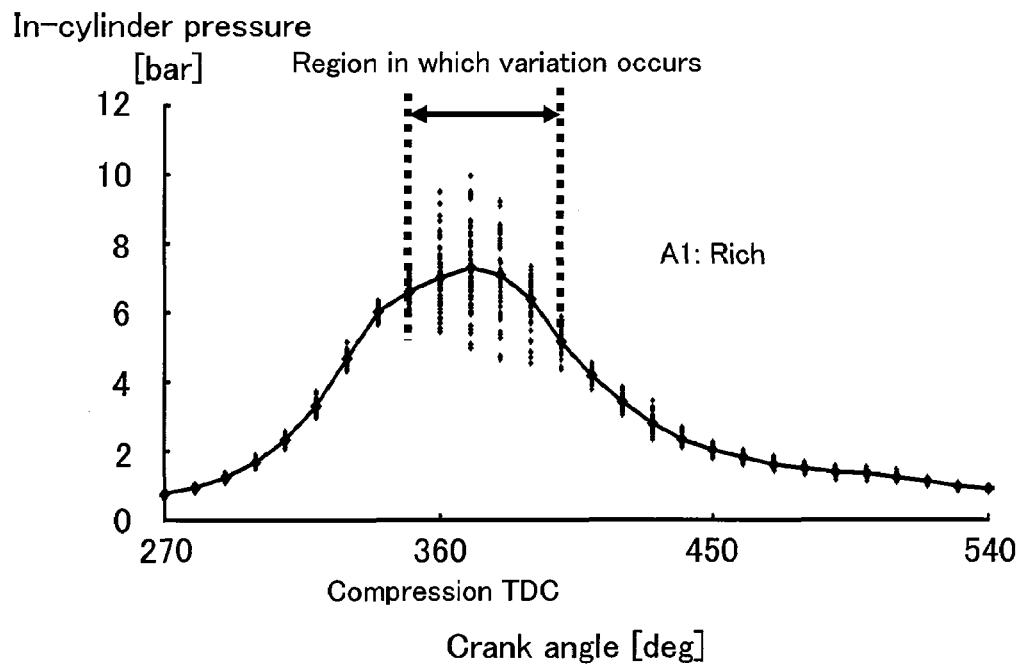
FIG. 22 is a diagram provided for description of the profile of in-cylinder pressure when an air-fuel ratio is rich (when ignition timing is not retarded).
Figure 23:
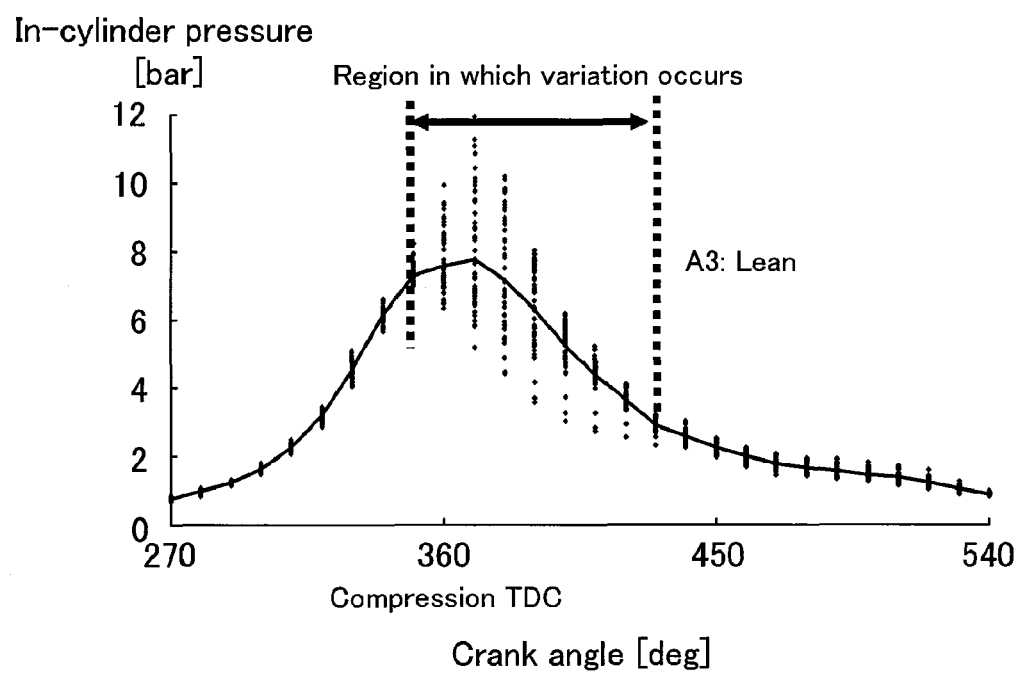
FIG. 23 is a diagram provided for description of the profile of in-cylinder pressure when an air-fuel ratio is lean.
Figure 24:
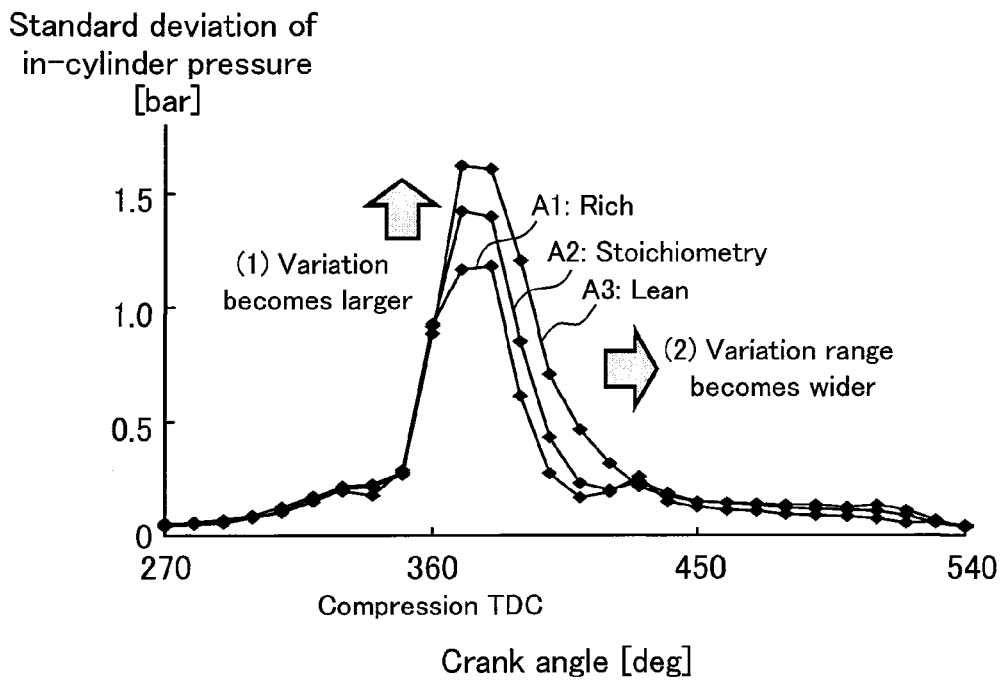
FIG. 24 is a diagram provided for description of characteristics of variation in the profile of in-cylinder pressure relative to an air-fuel ratio.
Figure 25:
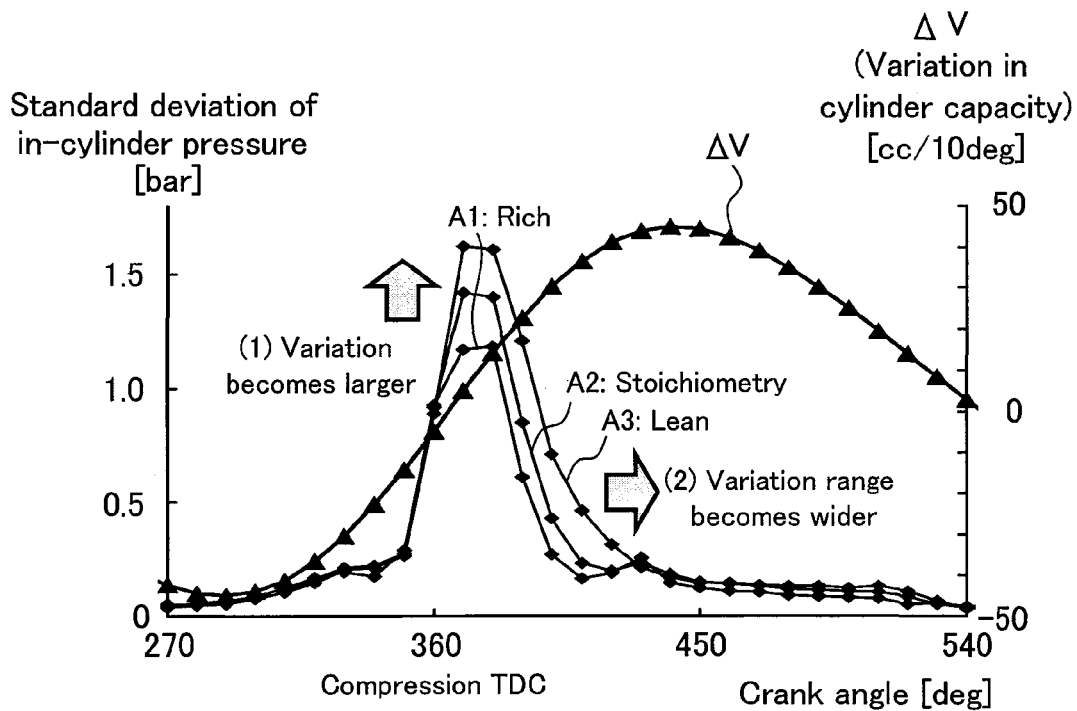
FIG. 25 is a diagram provided for characteristics of variation in the profile of in-cylinder pressure relative to an air-fuel ratio (with ΔV added).
Figure 26:
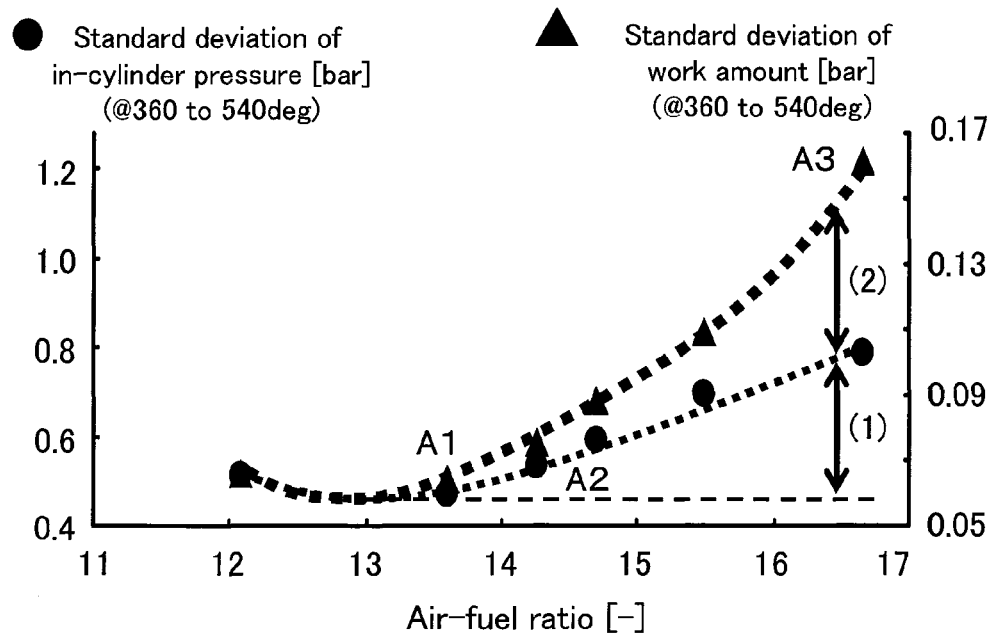
FIG. 26 is a diagram provided for description of characteristics of variation in in-cylinder pressure and work amount relative to an air-fuel ratio.
Figure 27:
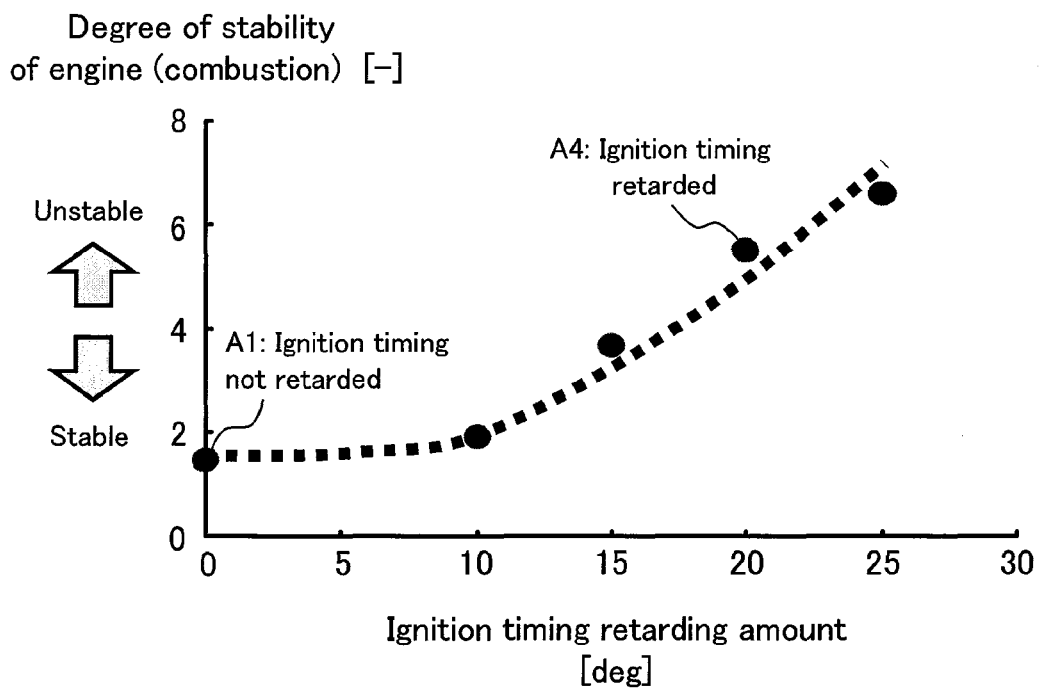
FIG. 27 is a diagram provided for description of characteristics of degree of stability relative to ignition timing retarding.
Figure 28:
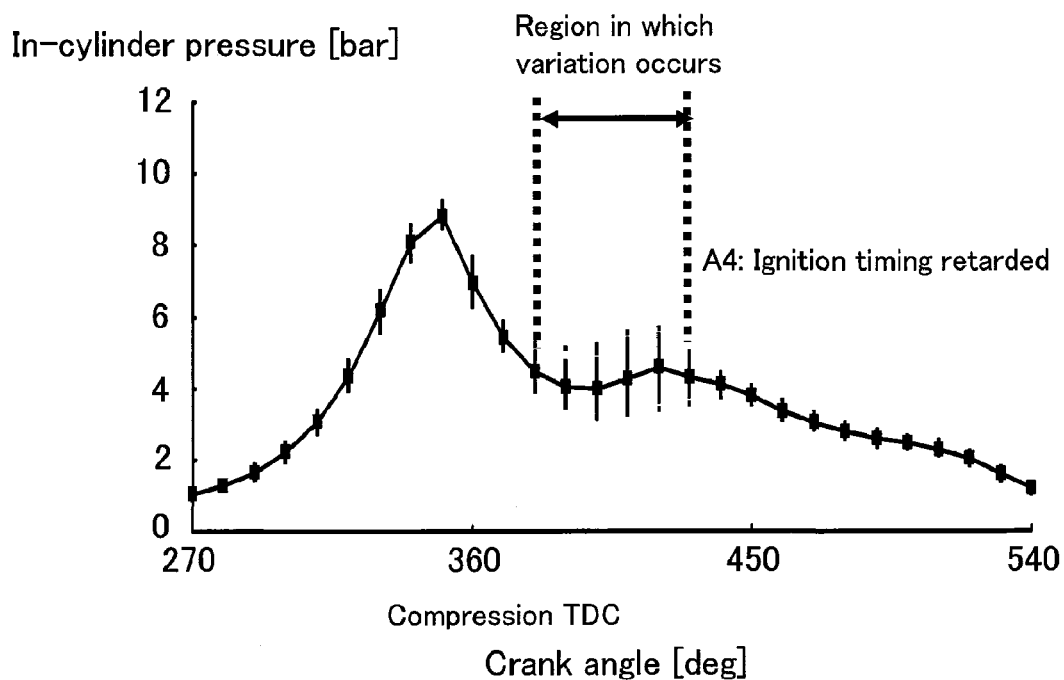
FIG. 28 is a diagram provided for description of the profile of in-cylinder pressure when ignition timing is retarded.
Figure 29:
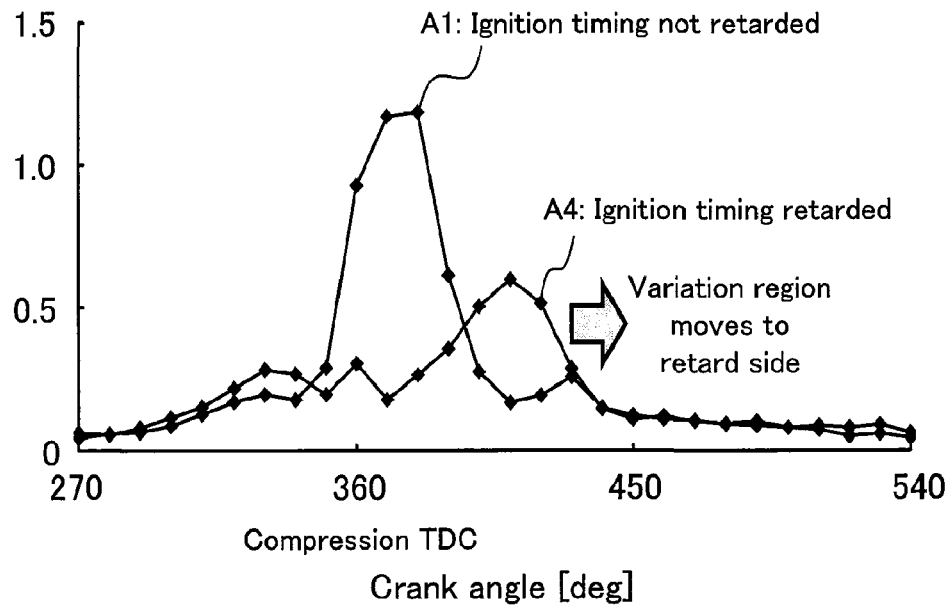
FIG. 29 is a diagram provided for description of characteristics of variation in the profiles of in-cylinder pressure when ignition timing is retarded and not retarded.
Figure 30:
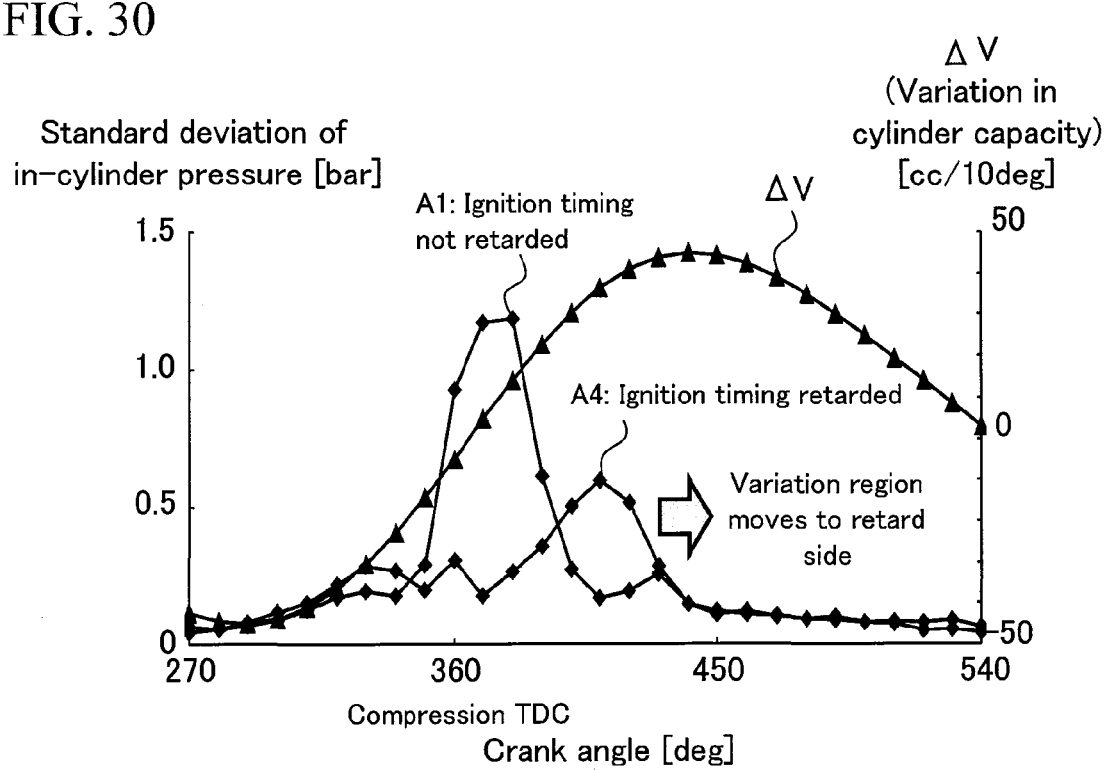
FIG. 30 is a diagram provided for description of characteristics of variation in the profiles of in-cylinder pressure when ignition timing is retarded and not retarded (with ΔV added).
Figure 31:
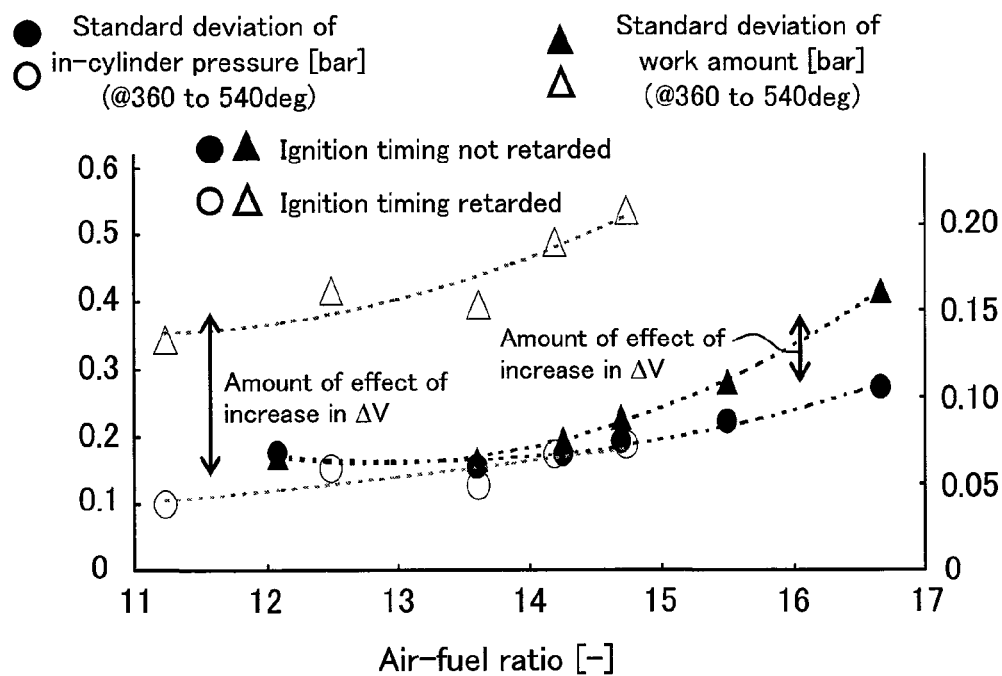
FIG. 31 is a diagram provided for description of characteristics of variation in the profiles of in-cylinder pressure and work amounts when ignition timing is retarded and not retarded, respectively.
Figure 32:
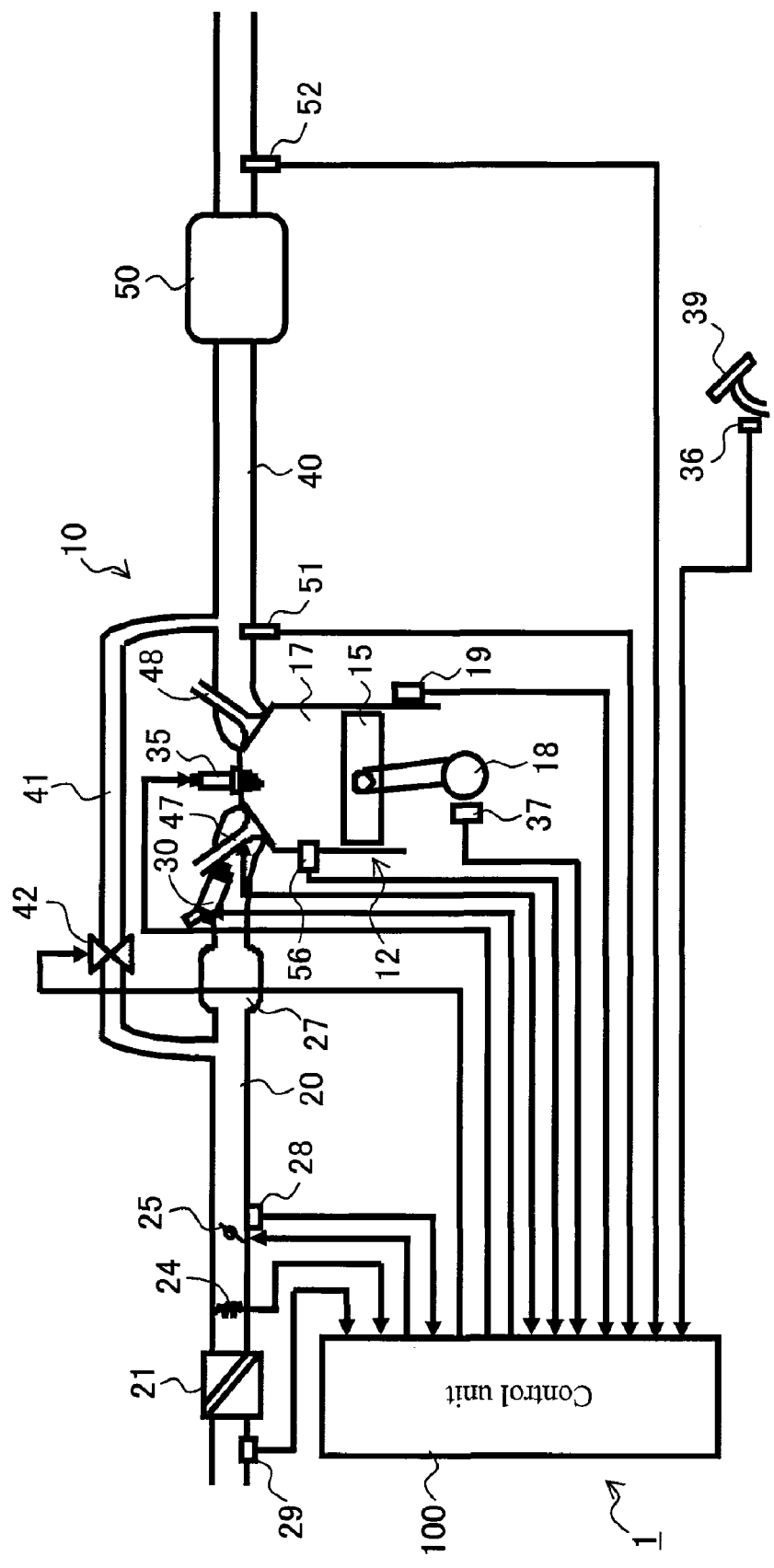
FIG. 32 is a schematic configuration diagram illustrating an engine to which an embodiment of a controller according to the present invention has been applied (common to first to third examples).

FIG. 32 is a schematic configuration diagram illustrating an embodiment of an engine controller according to the present invention (which is common to first to third examples) together with an example of a vehicle engine for which the engine controller has been employed.

An engine 10, which is illustrated in the Figure, is a multi-cylinder engine including, for example, four cylinders, and includes cylinders 12 (one of which is illustrated), and a piston 15 slidably inserted in each cylinder 12, and a combustion (actuation) chamber 17 is defined above the piston 15. A spark plug 35 is provided facing the combustion chamber 17 in each cylinder.

An air provided for fuel combustion is introduced from an air cleaner 21 provided at a starting end portion of an air intake passageway 20, passes through an air flow sensor 24, and also through an electrically-controlled throttle valve 25 and enters a collector 27, and then is taken into the combustion chamber 17 in each cylinder from the collector 27 via an air intake valve 47 arranged at a downstream end of the air intake passageway 20. Also, a fuel injection valve 30 is arranged at a downstream portion (around air intake ports) of the air intake passageway 20.

An air mixture of air taken into the combustion chamber 17 and fuel injected from the fuel injection valve 30 is caused to burn by spark ignition via the spark plug 35, and the resulting combustion water gas (exhaust) is emitted to an exhaust passageway 40 from the combustion chamber 17 via an exhaust valve 48, and flows into a three-way catalyst 50 provided in the exhaust passageway 40 for purification and then emitted to the outside.

Also, an oxygen (concentration) sensor 52 is arranged downstream of the three-way catalyst 50 in the exhaust passageway 40, and an A/F sensor (air-fuel ratio sensor) 51 that detects the air-fuel ratio of exhaust is arranged upstream of the catalyst 50 in the exhaust passageway 40.

The air-fuel ratio sensor 51 includes a linear output characteristic relative to the concentration of oxygen contained in exhaust. The relationship between the concentration of oxygen in exhaust and the air-fuel ratio is substantially linear, and accordingly, the air-fuel ratio of exhaust before being purified by the catalyst 50 can be obtained by means of the air-fuel ratio sensor 51 that detects oxygen concentration. In a control unit 100 (which will be described later), the air-fuel ratio of exhaust upstream of the three-way catalyst 50 is obtained from a signal from the air-fuel ratio sensor 51, and whether the exhaust is rich or lean relative to the concentration of oxygen downstream of the three-way catalyst 50 or the stoichiometry from a signal from the oxygen sensor 52. Also, F/B control to successively correct the fuel injection amount or the air amount is performed so that the three-way catalyst 50's purification efficiency becomes optimum, using outputs of both of the sensors 51 and 52.

A part of the exhaust gas emitted from the combustion chamber 17 to the exhaust passageway 40 is introduced to the air intake passageway 20 via an EGR passageway 41 as necessary, and is flowed back to the combustion chamber 17 in each cylinder via the air intake passageway 20. An EGR valve 42 for adjusting an EGR ratio is disposed in the EGR passageway 41.

The controller 1 according to the present embodiment includes a control unit 100 that includes a microcomputer, for performing various control for the engine 10.

Figure 33:
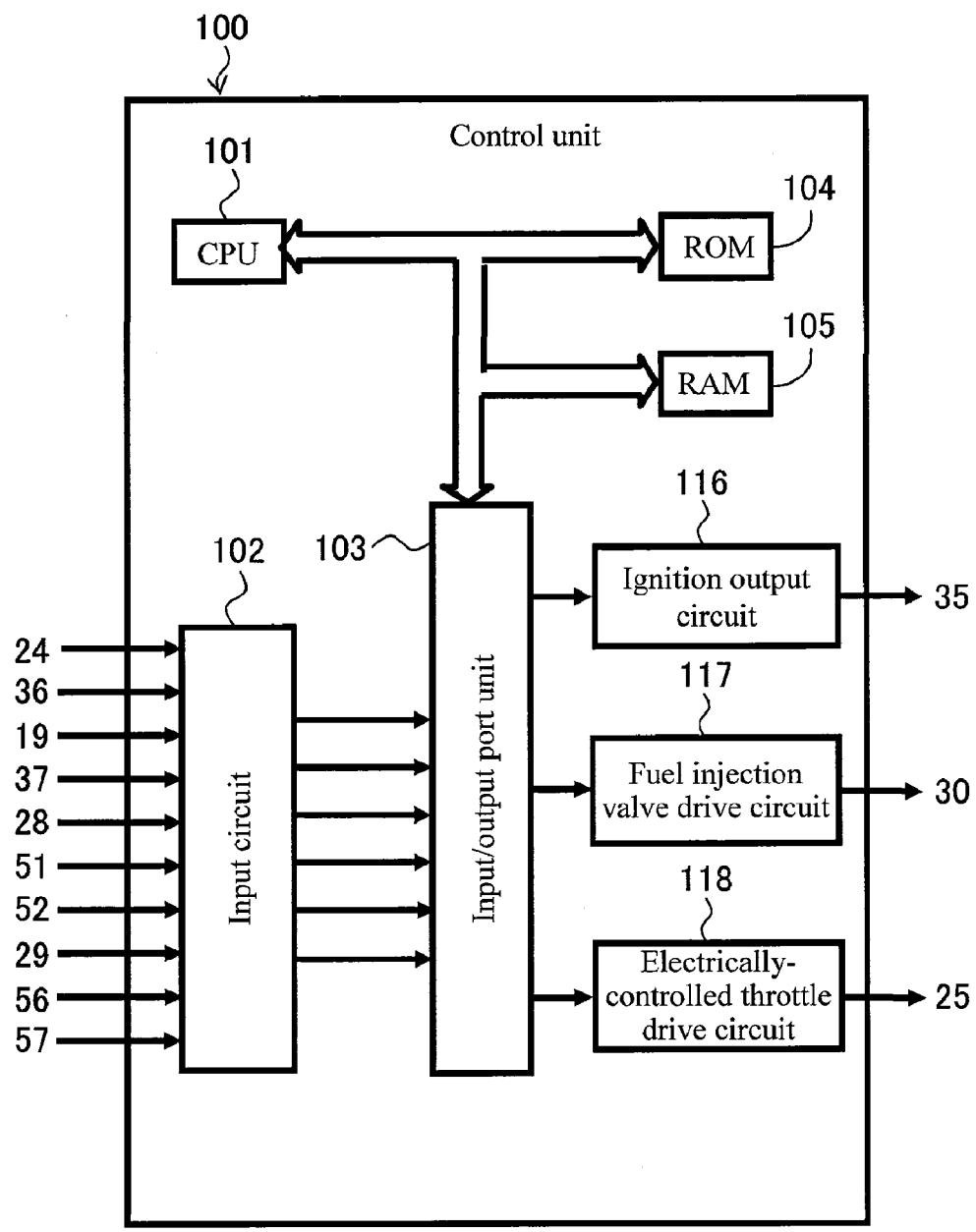
FIG. 33 is a diagram illustrating an internal configuration of a control unit, which is illustrated in FIG. 32 (common to first to third examples).

The control unit 100 basically, as illustrated in FIG. 33, includes a CPU 101, an input circuit 102, an input/output port unit 103, a RAM 105, a ROM 104, etc.

To the control unit 100, signals, such as a signal according to an amount of intake air detected by the air flow sensor 24, a signal according to the degree of opening of the throttle valve 25 detected by a throttle sensor 28, a signal representing the rotation (rotation speed of the engine) and phase of a crank shaft 18 obtained from a crank angle sensor (rotation speed sensor) 37 (a signal pulse is output from the crank angle sensor 37 per one rotational angle degree, for example), a signal representing whether the exhaust is rich or lean relative to the concentration of oxygen downstream of three-way catalyst 50 or the stoichiometry from the oxygen sensor 52 disposed downstream of the three-way catalyst 50 in the exhaust passageway 40, a signal according to the concentration of oxygen (air-fuel ratio) detected by the air-fuel ratio sensor 51 disposed at an exhaust collection portion upstream of the catalyst 50 in the exhaust passageway 40, a signal according to the temperature of engine cooling water detected by a water temperature sensor 19 disposed in the cylinder 12, a signal according to the amount of depression of an accelerator pedal 39 obtained from an accelerator sensor 36 (representing a torque demanded by the driver), a signal according to the pressure of the inside of each cylinder (inside of each combustion chamber 17) obtained from an in-cylinder pressure sensor 56, and a signal according to the temperature of the inside of each cylinder (inside of each combustion chamber 17) obtained from an in-cylinder temperature sensor 57, are supplied as input signals.

Outputs of the sensors such as the air-fuel ratio sensor 51, the oxygen sensor 52, the throttle sensor 28, the air flow sensor 24, the crank angle sensor 37, the water temperature sensor 19, the accelerator sensor 36 and the in-cylinder pressure sensor 56 are input to the control unit 100, and from these sensor outputs, the control unit 100 recognizes the engine driving conditions, and based on these driving conditions, calculates the major operation amounts for the engine, such as the intake air amount, the fuel injection amount and the ignition timing. The fuel injection amount calculated by the control unit 100 is converted into a valve opening pulse signal, which is sent from a fuel injection valve drive circuit 117 to the fuel injection valve 30. Also, a drive signal is sent from an ignition output circuit 116 to the spark plug 35 so that ignition is performed at the ignition timing calculated by the control unit 100.

More specifically, in the control unit 100, the outputs are subjected to signal processing such as denoising in the input circuit 102, and then sent to the input/output port unit 103. The values of the input ports 103 are stored in the RAM 105 and subjected to arithmetic processing in the CPU 101. A control program with the content of the arithmetic processing written therein is written in advance in the ROM 104. The values representing the operation amounts of the respective actuators, which are calculated according to the control program, are stored in the RAM 105 and then sent to the output ports 103.

For a drive signal for the spark plug 35, an on/off signal, which is on when current flows in a primary coil in the ignition output circuit 116, and is off when current does not flow in it, is set. Ignition timing is a point of time when the signal changes from on to off. A signal for the spark plug 35, which is set in the output port 103, is amplified in the ignition output circuit 116 to have sufficient energy necessary for ignition and supplied to the spark plug 35. Also, for a drive signal for the fuel injection valve 30 (valve opening pulse signal), an on/off signal, which is on during the valve being opened, and is off during the valve being closed, is set, and is amplified in the fuel injection valve drive circuit 117 to have energy sufficient for opening the fuel injection valve 30, and supplied to the fuel injection valve 30. A drive signal to provide the target degree of opening of the electrically-controlled throttle valve 25 is sent to the electrically-controlled throttle valve 25 via an electrically-controlled throttle drive circuit 118.

Next, the content of processing performed by the control unit 100 will be described in details. A description will be provided below on the control program written in the ROM 104.

First Example (1A)

FIG. 34

Figure 34:
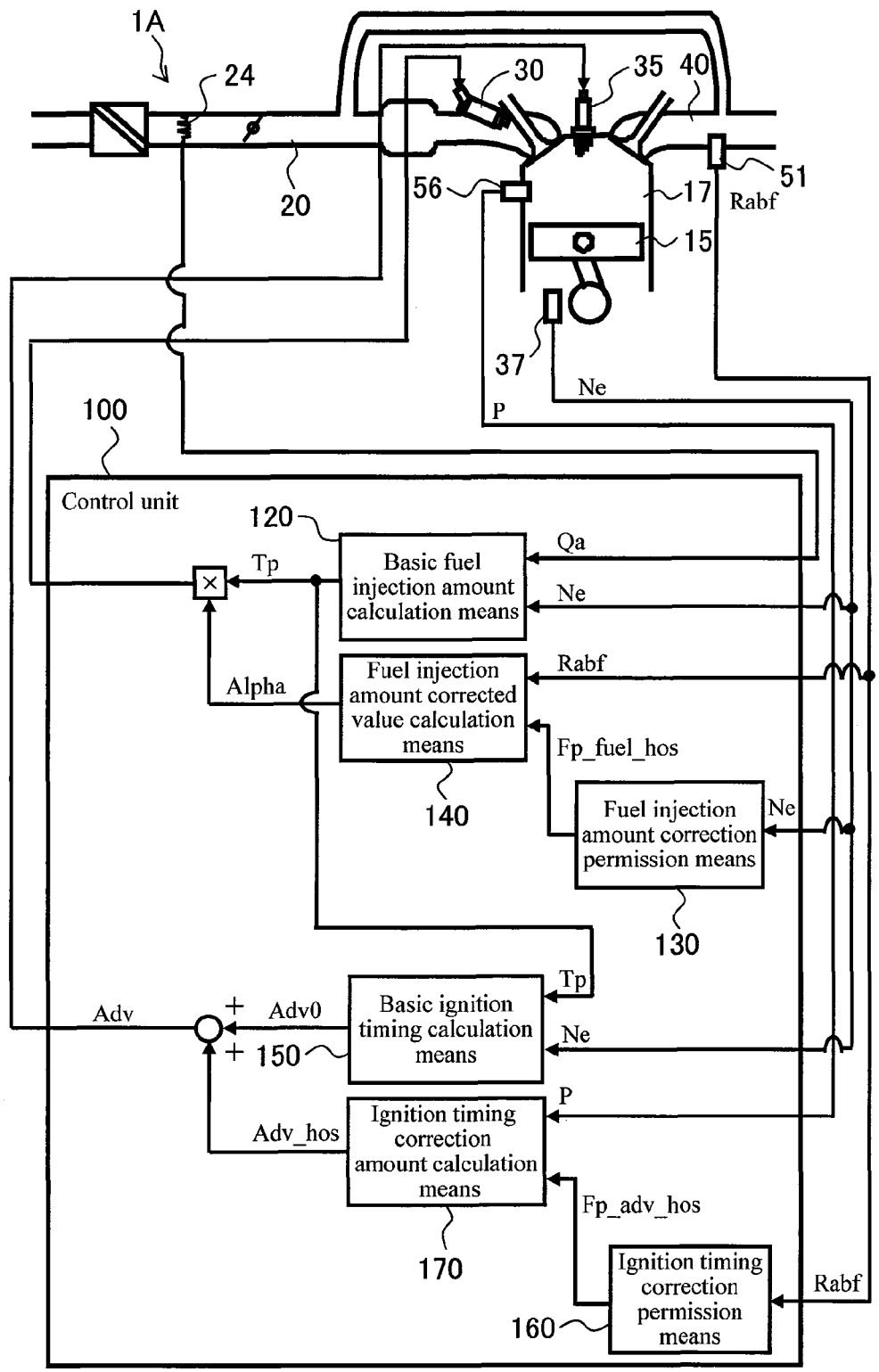
FIG. 34 is a control system diagram for a first example.
Figure 38:
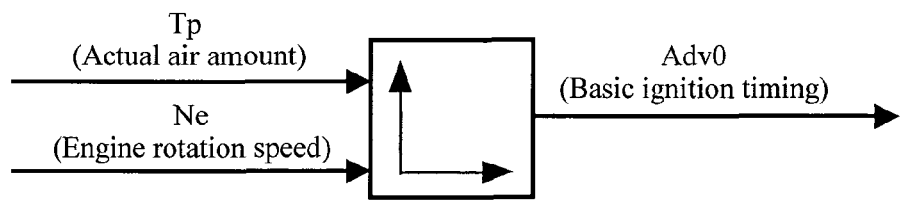
FIG. 38 is a diagram provided for description of basic ignition timing calculation means in first to third examples.
Figure 39:
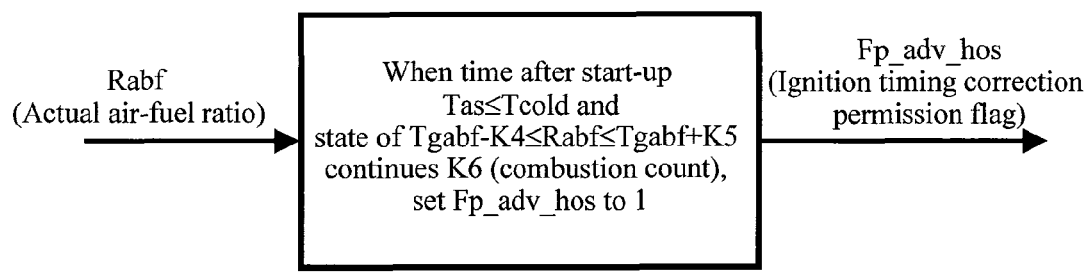
FIG. 39 is a diagram provided for description of ignition timing correction permission means in a first example.
Figure 40:
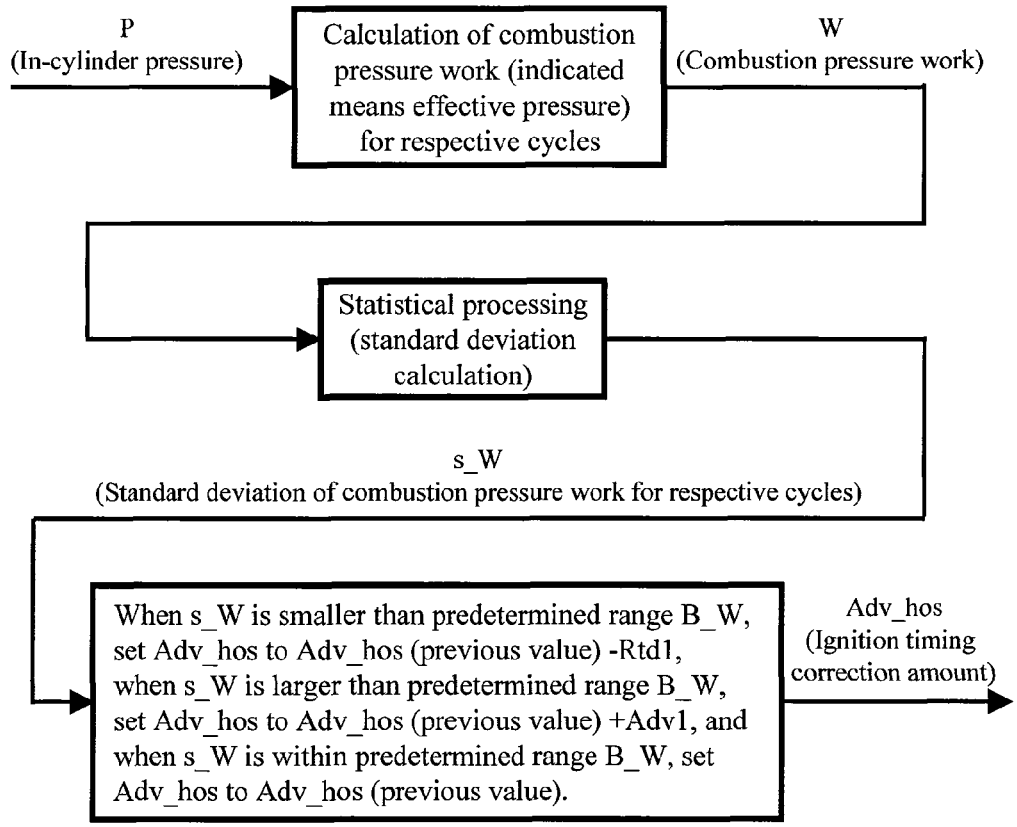
FIG. 40 is a diagram provided for description of ignition timing correction amount calculation means in a first example.

FIG. 34 is a control system diagram illustrating a controller 1A according to a first example. The controller 1A illustrated in the Figure includes the following calculation means and permission means:

basic fuel injection amount calculation means 120 (FIG. 35);

fuel injection amount correction permission means 130 (FIG. 36);

fuel injection amount correction value calculation means 140 (FIG. 37);

basic ignition timing calculation means 150 (FIG. 38);

ignition timing correction permission means 160 (FIG. 39); and ignition timing correction amount calculation means 170 (FIG. 40).

In the present example (1A), a basic fuel injection amount (Tp) is calculated by the basic fuel injection amount calculation means 120. Whether or not to correct the basic fuel injection amount (Tp) is determined by the fuel injection amount correction permission means 130. In other words, whether or not to correct the fuel injection amount to make the air-fuel ratio fall within a predetermined range is determined. When it is determined to make the correction, a fuel injection amount correction permission flag Fp_fuel_hos is set to 1. When it is determined not to make the correction, Fp_fuel_hos is set to 0. In the fuel injection amount correction value calculation means 140, when Fp_fuel_hos=1, a fuel injection amount correction value (Alpha) is calculated based on an output Rabf of the air-fuel ratio sensor 51, so as to make the air-fuel ratio fall within the predetermined range.

Basic ignition timing (Adv0) is calculated by the basic ignition timing calculation means 150. Whether or not to correct the basic ignition timing (Adv0) is determined by the ignition timing correction permission means 160. In other words, whether or not to make correction to retard the ignition timing until predetermined degree of stability is reached is determined. When it is determined to make the correction, an ignition timing correction permission flag Fp_adv_hos is set to 1. When it is determined not to make the correction, Fp_adv_hos is set to 0. When Fp_adv_hos=1, the ignition timing correction amount calculation means calculates the amount of correction (Adv_hos) to retard the timing until the predetermined degree of stability is reached, based on an output P of the in-cylinder pressure (combustion pressure) sensor 56.

Hereinafter, details of the individual control (calculation means and permission means will be described.

<Basic Fuel Injection Amount Calculation Means 120 (FIG. 35)>

The calculation means 120 calculates the basic fuel injection amount (Tp). More specifically, the calculation is performed according to the formula illustrated in FIG. 35. Here, Cyl represent the number of cylinders. K0 is determined based on the specifications of an injector (the relationship between the fuel injection pulse width and the fuel injection amount).

<Fuel Injection Amount Correction Permission Means 130 (FIG. 36)>

This calculation means (permission means) 130 determines whether or not to correct the basic fuel injection amount (Tp). More specifically, as illustrated in FIG. 36, when a state of TgNe−K1≦Ne≦TgNe+K2 continues no less than K3 (combustion count), the permission means 130 permits correction of the basic fuel injection amount (Tp), and sets Fp_fuel_hos to 1.

These conditions are provided for determining a state in which the engine rotation speed after start-up converges near a target speed for idling time. TgNe is a target rotation speed for idling after start-up. Also, it is favorable to empirically determine the parameters K1, K2 and K3. When Fp_fuel_hos=1, the fuel injection amount correction value (Alpha) is calculated by the fuel injection amount correction value calculation means (FIG. 37), which will be described below.

<Fuel Injection Amount Correction Value Calculation Means 140 (FIG. 37)>

Here, when Fp_fuel_hos=1, F/B (feedback) control is performed so as to make the air-fuel ratio fall within the predetermined range, based on the air-fuel ratio detected by the A/F sensor 51. More specifically, as illustrated in FIG. 37, the fuel injection amount correction value Alpha is calculated by means of PI control, from the deviation Dltabf of the A/F sensor-detected air-fuel ratio Rabf from a target air-fuel ratio Tabf.

The target air-fuel ratio Tabf is Tabf_cold until the time after start-up Tcold, and it is Tabf_hot until the time after start-up Thot. Thot corresponds to the time for activating the three-way catalyst 50. During Tabf_cold, it is desirable to set the air-fuel ratio to be in a range of 15 to 16, which provides a minimum concentration of HC emitted from the engine and also providing the largest retarding effect. Also, during Tabf_hot, it is desirable to set the air-fuel ratio to be in a range of 14.6 to 14.7, which provides the highest purification efficiency for the three-way catalyst 50.

<Basic Ignition Timing Calculation Means 150 (FIG. 38)>

The calculation means 150 calculates the basic ignition timing (Adv0). More specifically, as illustrated in FIG. 38, the basic ignition timing (Adv0) is calculated from an actual air amount (Qa) and an engine rotation speed (Ne), with reference to a table. Although it is desirable to set a table so as to provide MBT, and values taking degree of stability into consideration in the respective driving conditions may also be set (providing a torque correction margin relative to MBT so that the torque can be corrected in case of sudden instability).

<Ignition Timing Correction Permission Means 160 (FIG. 39)>

This calculation means (permission means) 160 determines whether or not to correct the basic ignition timing (Adv0). More specifically, as illustrated in FIG. 39, when time after startup Tas≦Tcold, and a state of Tgabf−K4≦Rabf≦Tgabf+K5 continues no less than K6 (combustion count), the permission means 160 permits correction of the basic ignition timing (Adv0), and sets Fp_adv_hos to 1.

These conditions are provided for determining a state in which the actual air-fuel ratio converges on an air-fuel ratio that provides the largest effect of retarding. It is favorable to empirically the parameters K4, K5 and K6. When Fp_adv_hos=1, an ignition timing correction amount (Adv_hos) is calculated by the ignition timing correction amount calculation means 170 (FIG. 40), which will be described below.

<Ignition Timing Correction Amount Calculation Means 170 (FIG. 40)>

Here, when Fp_adv_hos=1, the amount of correction for retarding the ignition timing (Adv_hos) until the predetermined degree of stability is reached is calculated based on the output P of the in-cylinder pressure (combustion pressure) sensor 56. More specifically, as illustrated in FIG. 40, the following processing is performed:

Calculating combustion pressure work (or indicated means effective pressure) W for the respective cycles from the output value P of the in-cylinder pressure sensor 56;

Performing calculating statistical processing (such as standard deviation calculation) for W in order to calculate the degree of variation (degree of instability) of W to obtain the standard deviation s_W of the combustion pressure work per cycle;

When s_W is smaller than a predetermined range B_W, setting Adv_hos to Adv_hos (previous value)−Rtd1, when s_W is larger than the predetermined range B_W, setting Adv_hos to Adv_hos (previous value)+Adv1, and when s_W is within the predetermined range B_W, setting Adv_hos to Adv_hos (previous value).

It is desirable to set B_W to a value corresponding to the limit of stability. Rtd1 and Adv1 are parameters for determining the retarding speed and the advancing speed. As these speeds are high (the parameters have a larger value), a larger exhaust reduction effect can be expected; however the ignition timing control system becomes prone to be unstable by that amount. The speeds may also be determined empirically according to the characteristics (such as responsiveness) of the engine.

Advantages of the First Example

According to the first example, after start-up of the engine, on-board optimization of the air-fuel ratio is first performed (controlling the air-fuel ratio to be within a range of 15 to 16) and then on-board retarding of the ignition timing is performed to the limit of stability, enabling using up the HC minimizing potential the engine has, regardless of various disturbances occurring in the environment of practical use.

Second Example (1B)

FIG. 41

Although in the above-described first example (1A), the air-fuel ratio is optimized (control is performed to correct the fuel amount) using the air-fuel ratio sensor 51, and the ignition timing is retarded to the limit of stability (the ignition timing is corrected) using the in-cylinder pressure (combustion pressure) sensor 56, in a second example (1B), the air-fuel ratio is optimized and then control is performed to retard the ignition timing to the limit of stability, using a crank angle signal for the engine.

Figure 41:
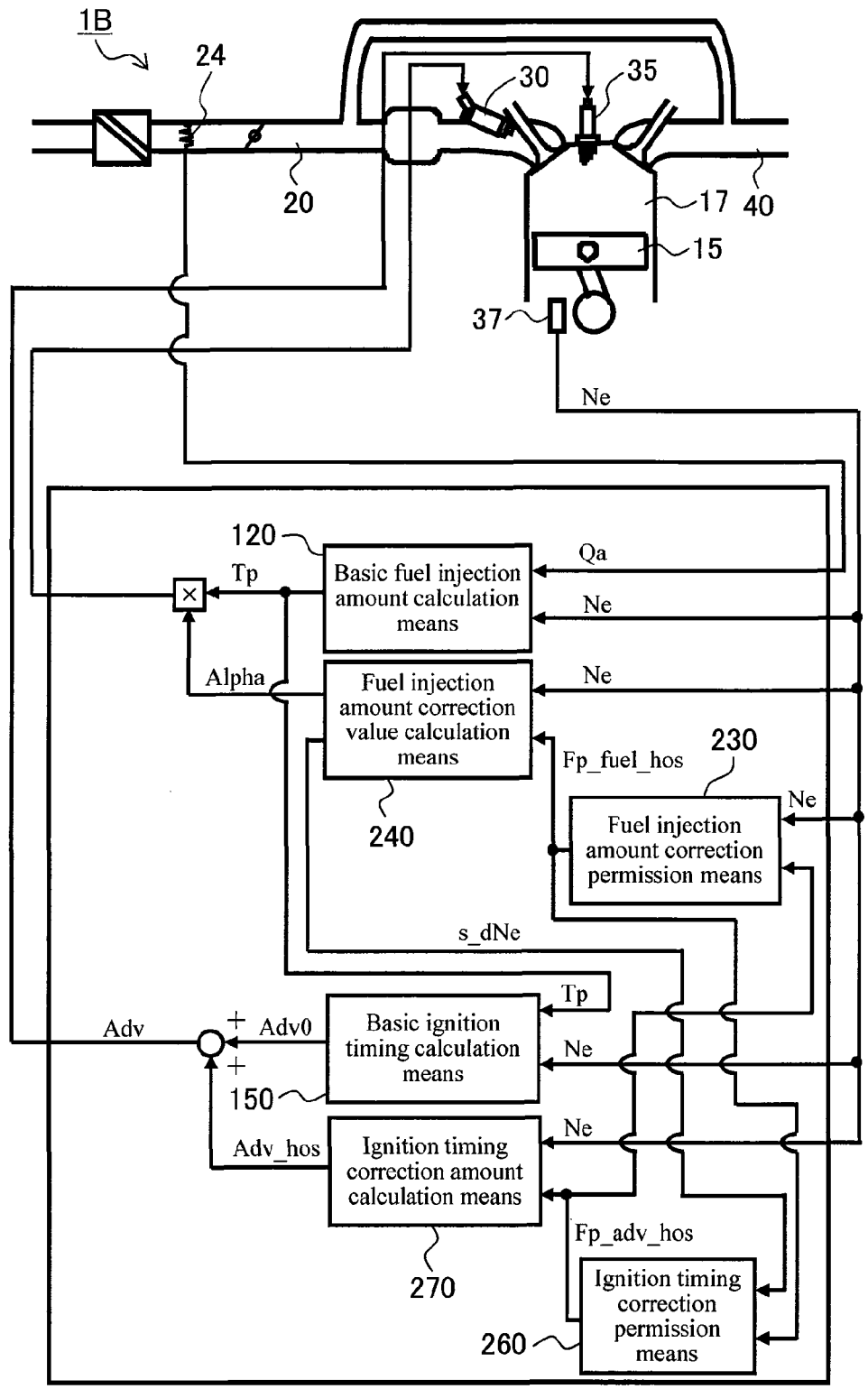
FIG. 41 is a control system diagram for a second example.

FIG. 41 is a control system diagram illustrating a controller 1B according to the second example, and parts corresponding to the parts of the controller 1A in the first example are provided with the same reference numerals as those in the first example, and an overlapping description thereof is omitted.

Figure 44:
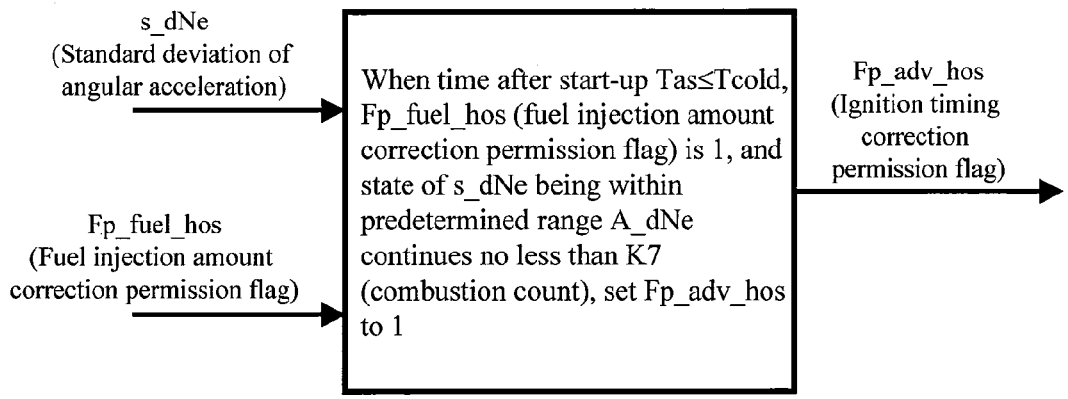
FIG. 44 is a diagram provided for description of ignition timing correction permission means in second and third examples.
Figure 45:
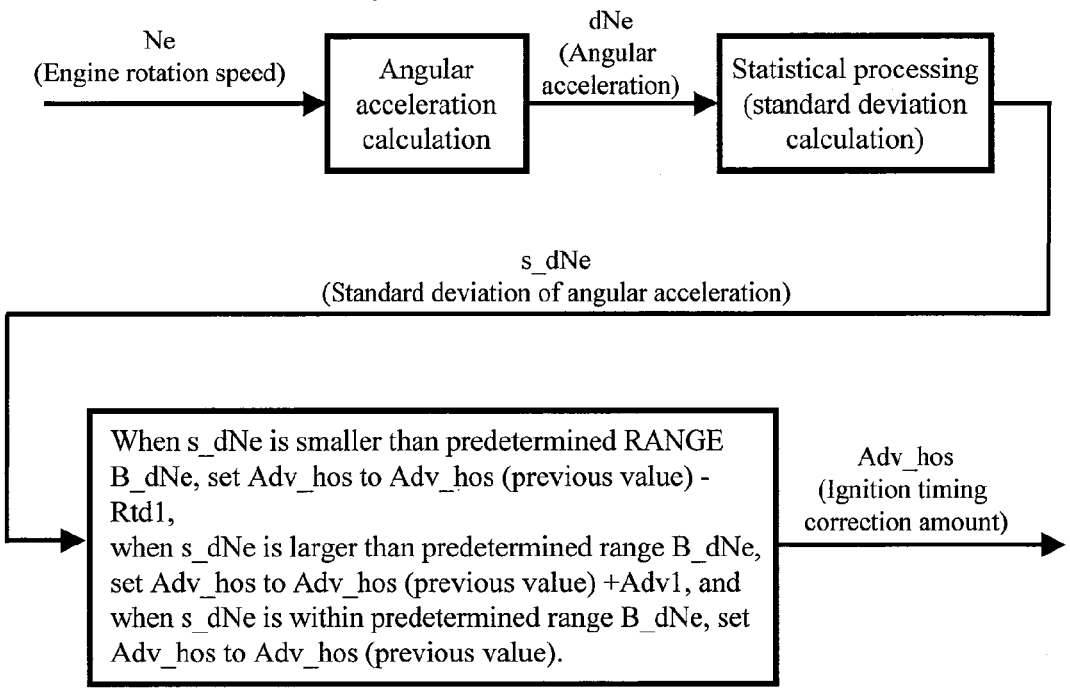
FIG. 45 is a diagram provided for description of ignition timing correction amount calculation means in a second example.

The controller 1B according to the second example includes the following calculation means and permission means:

basic fuel injection amount calculation means 120 (FIG. 35);
fuel injection amount correction permission means 230 (FIG. 42);
fuel injection amount correction value calculation means 240 (FIG. 43);
basic ignition timing calculation means 150 (FIG. 38);
ignition timing correction permission means 260 (FIG. 44); and
ignition timing correction amount calculation means 270 (FIG. 45).

In this example (1B), a basic fuel injection amount (Tp) is calculated by the basic fuel injection amount calculation means 120. Whether or not to correct the basic fuel injection amount (Tp) is determined by the fuel injection amount correction permission means 230. In other words, whether or not to correct the fuel injection amount to make the air-fuel ratio fall within a predetermined range is determined. If it is determined to make the correction, a fuel injection amount correction permission flag Fp_fuel_hos is set to 1. If it is determined not to make the correction, Fp_fuel_hos is set to 0. When Fp_fuel_hos=1, the fuel injection amount correction value calculation means 240 calculates a fuel injection amount correction value (Alpha) so as to make the air-fuel ratio fall within the predetermined range, based on the output of the crank angle sensor 37.

Basic ignition timing (Adv0) is calculated by the basic ignition timing calculation means 150. Whether or not to correct the basic ignition timing (Adv0) is determined by the ignition timing correction permission means 260. In other words, whether or not to make correction to retard the ignition timing until predetermined degree of stability is reached is determined. If it is determined to make the correction, an ignition timing correction permission flag Fp_adv_hos is set to 1. If it is determined not to make the correction, Fp_adv_hos is set to 0. When Fp_adv_hos=1, the ignition timing correction amount calculation means calculates an amount of correction for retarding the ignition timing (Adv_hos) until the predetermined degree of stability is reached, based on the output of the crank angle sensor 37.

Details of the respective control (calculation means and permission means) will be described below.

<Basic Fuel Injection Amount Calculation Means 120 (FIG. 35)>

The calculation means 120 calculates the basic fuel injection amount (Tp). More specifically, the calculation is illustrated in FIG. 35, but it is the same as that in the first example, and thus, a detailed description thereof will not be provided.

<Fuel Injection Amount Correction Permission Means 230 (FIG. 42)>

This calculation means (permission means) 230 determines whether or not to correct the basic fuel injection amount (Tp). More specifically, as illustrated in FIG. 36, when the time after start-up Tas≦Tcold, a state of TgNe−K1≦Ne≦TgNe+K2 continues no less than K3 (combustion count), and Fp_adv_hos (ignition timing correction permission flag) is 0, Fp_fuel_hos is set to 1.

Thot in the above conditions corresponds to the time for activating the three-way catalyst 50, and is provided for determining whether or not the three-way catalyst 50 is inactive.

The above conditions are provided for determining a state in which the engine rotation speed after start-up converges near a target speed for idling. TgNe is a target rotation speed for idling after start-up. Also, it is favorable to empirically determine the parameters K1, K2 and K3.

The above conditions are intended to correct the air-fuel ratio when correction of the ignition timing is not being performed. This is because correction using a crank angle sensor signal is performed for only either the air-fuel ratio or the ignition timing, and thus, correction is not performed for both of them simultaneously.

When Fp_fuel_hos=1, the fuel injection amount correction value (Alpha) is calculated by the fuel injection amount correction value calculation means (FIG. 43), which will be described below.

<Fuel Injection Amount Correction Value Calculation Means 240 (FIG. 43)>

Figure 43:
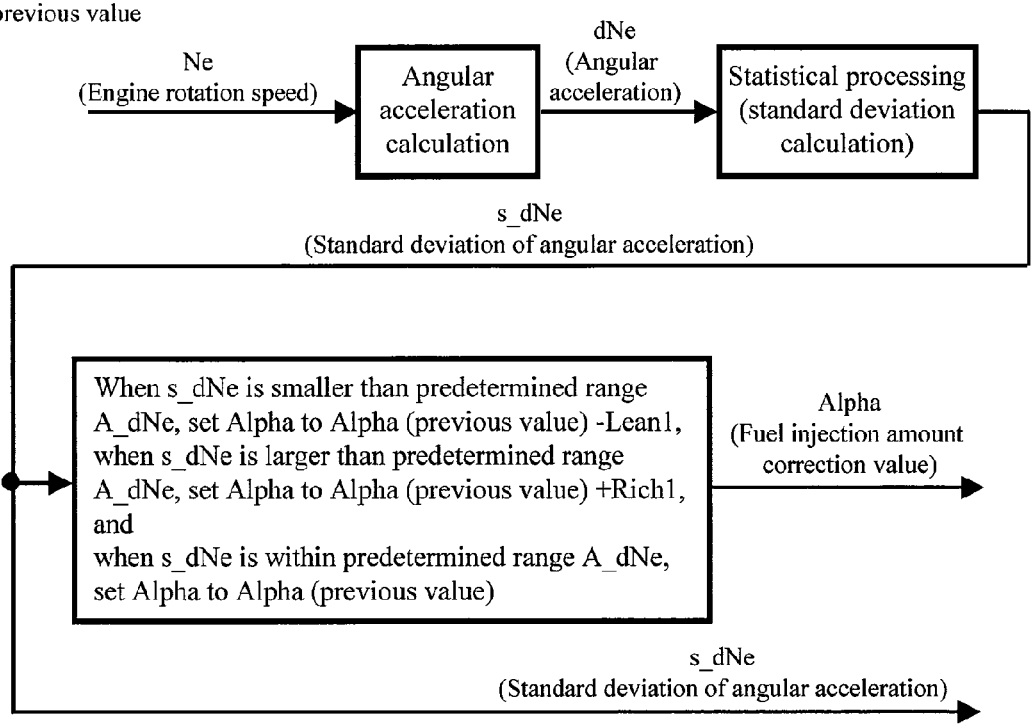
FIG. 43 is a diagram provided for description of fuel injection amount correction value calculation means in second and third examples.

Here, when Fp_fuel_hos=1, a correction value for the fuel injection amount is calculated based on the output of the crank angle sensor 37 so as to make the air-fuel ratio fall within the predetermined range. More specifically, as illustrated in FIG. 43, the following processing is performed:

Calculating the variation of the rotation speed, that is, an angular acceleration dNe, for the respective cycles, from the output value of the crank angle sensor 37;

Performing statistical processing (such as standard deviation calculation) for dNe to calculate the degree of variation (degree of instability) in dNe to obtain the standard deviation s_dNe for the angular acceleration; and when s_dNe is smaller than a predetermined range A_dNe, setting Alpha to Alpha (previous value)−Lean1, when s_dNe is larger than the predetermined range A_dNe, setting Alpha to Alpha (previous value)+Rich1, and when s_dNe is within the predetermined range A_dNe, setting Alpha to Alpha (previous value).

It is desirable to set A_dNe to an air-fuel ratio of 15 to 16. Lean1 and Rich1 are parameters for determining the leaning speed and the enriching speed. As those speeds are high (the parameters have a larger value), a larger exhaust reduction effect can be expected; however, the air-fuel ratio control system becomes prone to be unstable by that amount. The speeds may also be determined empirically according to the characteristics (such as responsiveness) of the engine.

When Fp_fuel_hos=0, Alpha is maintained at the previous value.

<Basic Ignition Timing Calculation Means 150 (FIG. 38)>

The calculation means 150 calculates the basic ignition timing (Adv0). More specifically, the calculation means 150 performs the processing illustrated in FIG. 38; however, such processing is the same as that in the first example, and thus will not be described in details.

<Ignition Timing Correction Permission Means 260 (FIG. 44)>

This calculation means (permission means) 260 determines whether or not to correct the basic ignition timing (Adv0). More specifically, as illustrated in FIG. 44, when the time after start-up Tas≦Tcold, and Fp_fuel_hos (fuel injection amount correction permission flag) is 1, and a state of s_dNe being within a predetermined range A_dNe continues no less than K7 (combustion count), the permission means 260 permits correction of the basic ignition timing (Adv0) and sets Fp_adv_hos to 1.

Thot in the above conditions corresponds to the time for activating the three-way catalyst 50, and is provided for determining whether or not the three-way catalyst 50 is inactive.

The above conditions are provided for determining a state in which an actual air-fuel ratio converges on an air-fuel ratio providing the largest effect of retarding.

When Fp_adv_hos is switched from 0 to 1, as described in relation to the fuel injection amount correction permission means (FIG. 42), Fp_fuel_hos is switched from 1 to 0, the fuel injection amount correction being stopped. This is because correction using a crank angle sensor signal is performed for only either the air-fuel ratio or the ignition timing, and thus, correction is not performed for both of them simultaneously.

When Fp_adv_hos=1, the ignition timing correction amount (Adv_hos) is calculated by the ignition timing correction amount calculation means 270 (FIG. 45), which will be described below.

<Ignition Timing Correction Amount Calculation Means 270 (FIG. 45)>

Here, when Fp_adv_hos=1, the amount of correction for retarding the ignition timing (Adv_hos) until the predetermined degree of stability is reached is calculated based on the output of the crank angle sensor 37. More specifically, as illustrated in FIG. 45, the following processing is performed:

Calculating the variation of the rotation speed, that is, an angular acceleration dNe, for the respective cycles, from the output value of the crank angle sensor 37;

Performing statistical processing (such as standard deviation calculation) for dNe to calculate the degree of variation (degree of instability) in dNe to obtain the standard deviation s_dNe for the angular acceleration; and when s_dNe is smaller than a predetermined range B_dNe, setting Adv_hos to Adv_hos (previous value)−Rtd1, when s_dNe is larger than the predetermined range B_dNe, setting Adv_hos to Adv_hos (previous value)+Adv1, and when s_dNe is within the predetermined range B_dNe, setting Adv_hos to Adv_hos (previous value).

It is desirable to set B_dNe to a value corresponding to the limit of stability. Rtd1 and Adv1 are parameters for determining the retarding speed and the advancing speed. As those speeds are high (the parameters have a larger value), a larger exhaust reduction effect can be expected; however, the ignition timing control system becomes prone to be unstable by that amount. The speeds may also be determined empirically according to the characteristics (such as responsiveness) of the engine.

Advantages of the Second Example

According to the second example, after start-up of the engine, on-board optimization of the air-fuel ratio is first performed (controlling the air-fuel ratio to be within a range of 15 to 16) and then on-board retarding of the ignition timing is performed to the limit of stability, using a crank angle sensor signal, enabling using up the HC minimizing potential the engine has, regardless of various disturbances occurring in the environment of practical use.

Third Example (1C)

FIG. 46

Although in the above-described second example (1B), the air-fuel ratio is first optimized, and then, the ignition timing is controlled to be retarded to the limit of stability, using a crank angle signal for the engine.

In conventional start-up control, correction to retard the ignition timing is made to some extent. However, as described in the Summary of the Invention section, the degree of stability deterioration during retarding almost inevitably becomes larger than that when the air-fuel ratio is lean. Therefore, in a third example (1C), the following control is performed. In other words, a certain degree of retarding is performed by default, and when it is determined that the stability becomes lower than a predetermined level, the retarding amount is first reduced (the ignition timing is brought back to the advance side) to enhance the stability. Then, the air-fuel ratio is made to be lean to reduce the HC emissions. Furthermore, if there a margin for stability, retarding is performed again.

Figure 46:
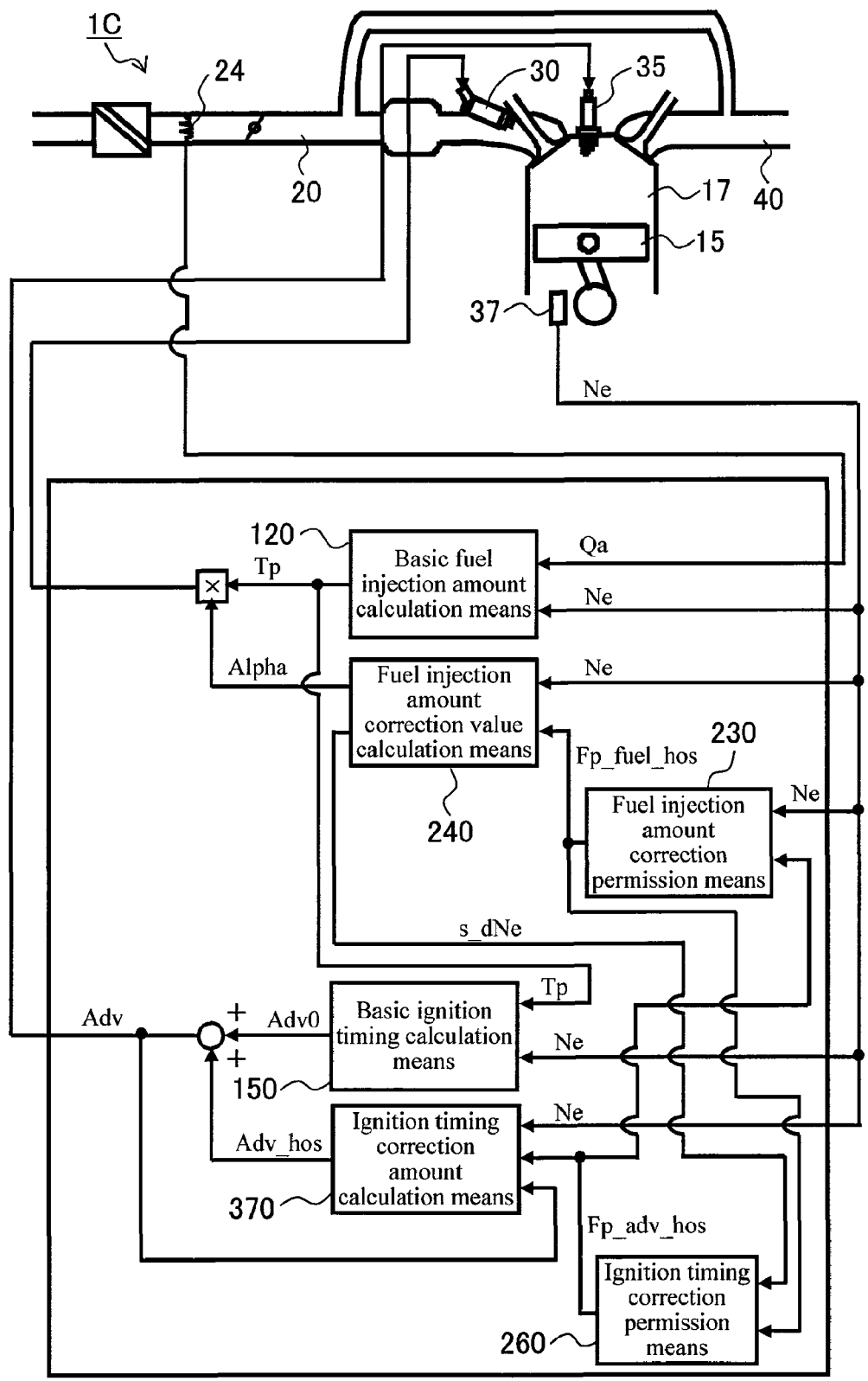
FIG. 46 is a control system diagram for a third example.

FIG. 46 is a control system diagram illustrating a controller 1C according to the third example, and parts corresponding to the parts in the controllers 1A and 1B in the first and second examples are provided with the same reference numerals as those in the first and second examples, and an overlapping description thereof is omitted.

Figure 42:
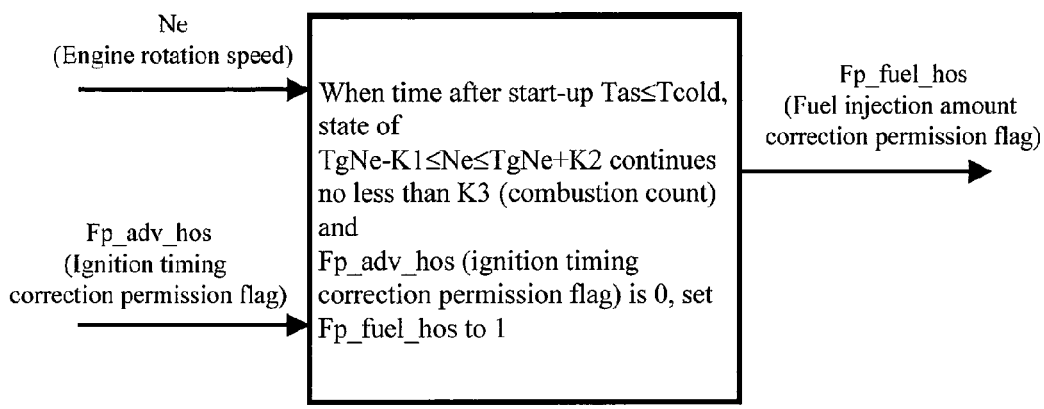
FIG. 42 is a diagram provided for description of fuel injection amount correction permission means in second and third examples.
Figure 47:
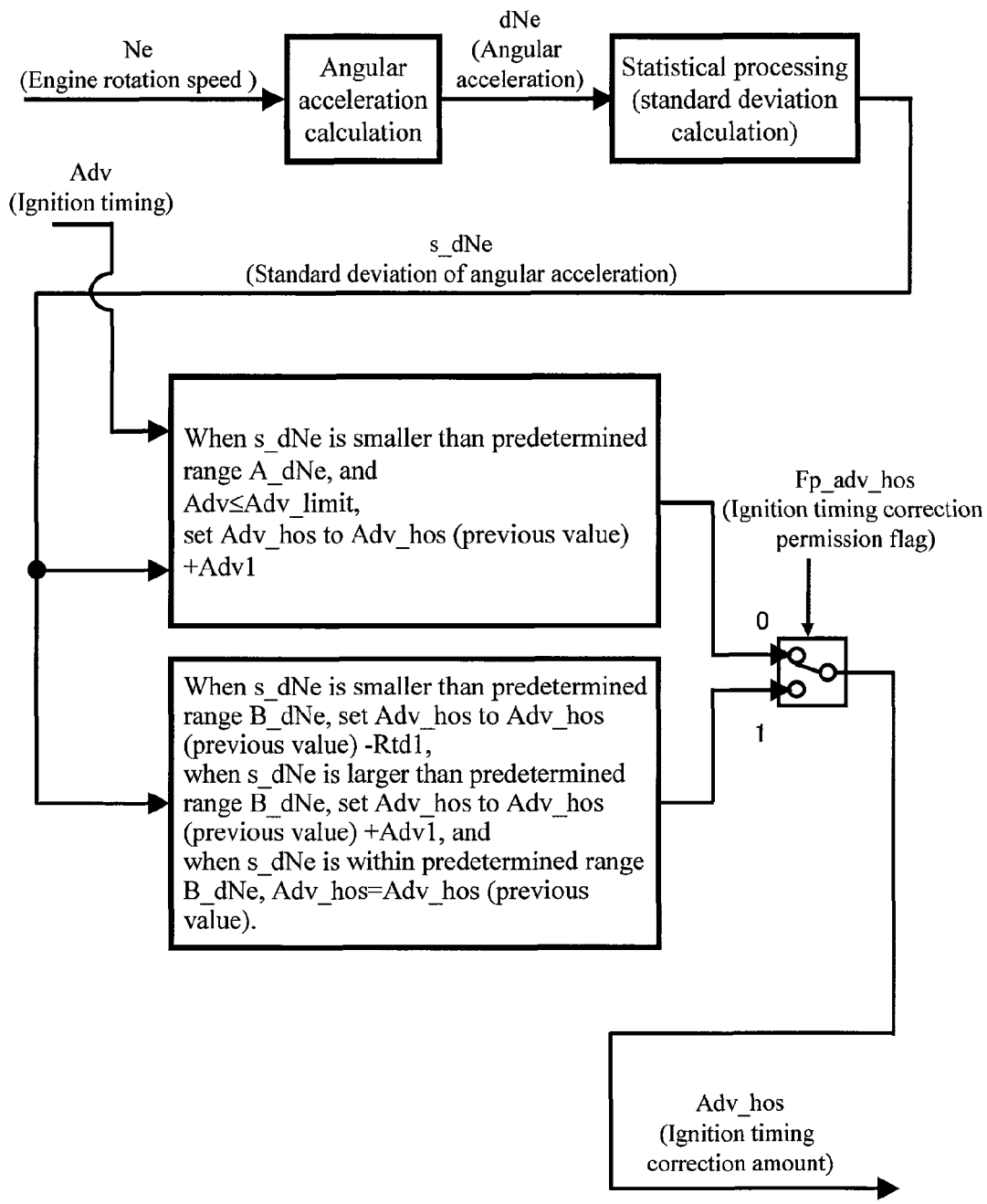
FIG. 47 is a diagram provided for description of ignition timing correction amount calculation means in a third example.

The controller 1C according to the third example includes the following calculation means and permission means:

basic fuel injection amount calculation means 120 (FIG. 35);

fuel injection amount correction permission means 230 (FIG. 42);

fuel injection amount correction value calculation means 240 (FIG. 43);

basic ignition timing calculation means 150 (FIG. 38);

ignition timing correction permission means 260 (FIG. 44); and ignition timing correction amount calculation means 370 (FIG. 47).

A basic fuel injection amount (Tp) is calculated by the basic fuel injection amount calculation means 120. Whether or not to correct the basic fuel injection amount (Tp) is determined by the fuel injection amount correction permission means 230. In other words, whether or not to correct the fuel injection amount to make the air-fuel ratio fall within a predetermined range is determined. If it is determined to make the correction, a fuel injection amount correction permission flag Fp_fuel_hos is set to 1. If it is determined not to make the correction, Fp_fuel_hos is set to 0. When Fp_fuel_hos=1, the fuel injection amount correction value calculation means 240, calculates a fuel injection amount correction value (Alpha) so as to make the air-fuel ratio fall within the predetermined range, based on the output of the crank angle sensor 37.

Basic ignition timing (Adv0) is calculated by the basic ignition timing calculation means 150. Whether or not to correct the basic ignition timing (Adv0) is determined by the ignition timing correction permission means. In other words, whether or not to make correction to retard the ignition timing until predetermined degree of stability is reached is determined. If it is determined to make the correction, an ignition timing correction permission flag Fp_adv_hos is set to 1. If it is determined not to make the correction, Fp_adv_hos is set to 0. When Fp_adv_hos=1, the ignition timing correction amount calculation means 370 calculates an amount of correction for retarding the ignition timing (Adv_hos) until the predetermined degree of stability is reached, based on the output of the crank angle sensor 37. However, when control for the air-fuel ratio side is being performed (when retarding control is not being performed) based on the output of the crank angle sensor 37, if the ignition timing is on the retard side relative to a predetermined value, the ignition timing is first brought back to the advance side to secure a margin for stability, so as to enable the air-fuel ratio to be controlled to be leaner.

Details of the respective control (calculation means and permission means) will be described below.

<Basic Fuel Injection Amount Calculation Means 120 (FIG. 35)>

The calculation means 120 calculates the basic fuel injection amount (Tp). More specifically, the calculation is illustrated in FIG. 35, but it is the same as that in the first example, and thus, a detailed description thereof will not be provided.

<Fuel Injection Amount Correction Permission Means 230 (FIG. 42)>

This calculation means (permission means) 230 determines whether or not to correct the basic fuel injection amount (Tp). More specifically, the correction is illustrated in FIG. 42, but it is the same as that in the second example, and thus, a detailed description thereof will not be provided.

<Fuel Injection Amount Correction Value Calculation Means 240 (FIG. 43)>

Here, when Fp_fuel_hos=1, a correction value for the fuel injection amount is calculated based on the output of the crank angle sensor 37 so as to make the air-fuel ratio fall within the predetermined range. More specifically, the calculation is illustrated in FIG. 43, but it is the same as that in the second example, and thus, a detailed description thereof will not be provided.

<Basic Ignition Timing Calculation Means 150 (FIG. 38)>

The calculation means 150 calculates the basic ignition timing (Adv0). More specifically, the processing is illustrated in FIG. 38 is performed, but it is the same as that in the first and second examples, and thus, a detailed description thereof will not be provided.

<Ignition Timing Correction Permission Means 260 (FIG. 44)>

This calculation means (permission means) 260 determines whether or not to correct the basic ignition timing (Adv0). More specifically, the calculation is illustrated in FIG. 44, but it is the same as that in the second example, and thus, a detailed description thereof will not be provided.

<Ignition Timing Correction Amount Calculation Means 370 (FIG. 47)>

Here, a correction amount (Adv_hos) for the ignition timing is calculated based on the output of the crank angle sensor 37. More specifically, as illustrated in FIG. 47, the following processing is performed:

When Fp_adv_hos=1, calculating the variation of the rotation speed, that is, an angular acceleration dNe, for the respective cycles, from the output value of the crank angle sensor 37;

performing statistical processing (such as standard deviation calculation) for dNe to calculate the degree of variation (degree of instability) in dNe to obtain the standard deviation s_dNe for the angular acceleration; and when s_dNe is smaller than a predetermined range B_dNe, setting Adv_hos to Adv_hos (previous value)−Rtd1, when s_dNe is larger than the predetermined range B_dNe, setting Adv_hos to Adv_hos (previous value)+Adv1, and when s_dNe is within the predetermined range B_dNe, setting Adv_hos to Adv_hos (previous value).

It is desirable to set B_dNe to a value corresponding to the limit of stability. Rtd1 and Adv1 are parameters for determining the retarding speed and the advancing speed. As those speeds are high (the parameters have a larger value), a larger exhaust reduction effect can be expected; however, the ignition timing control system becomes prone to be unstable by that amount. The speeds may also be determined empirically according to the characteristics (such as responsiveness) of the engine.

When Fp_adv_hos=0, s_dNe is smaller than a predetermined range A_dNe, and Adv≦Adv_limit, Adv_hos is set to Adv_hos (previous value)+Adv1.

In other words, when control for the air-fuel ratio is being performed (when retarding control is not being performed) based on the crank angle sensor signal, if the ignition timing is on the retard side relative to a predetermined value, it is first brought back to the advance side to secure a margin for stability, so as to enable the air-fuel ratio to be controlled to be leaner, allowing HC emissions to be reduced without relatively not deteriorating the stability. After making the air-fuel ratio be lean, if there is a margin for the stability, retarding is performed again by means of the aforementioned processing performed when Fp_adv_hos=1.

Advantages of the Third Example

According to the present example, after start-up of the engine, on-board optimization of the air-fuel ratio is first performed (controlling the air-fuel ratio to be within a range of 15 to 16) and then on-board retarding of the ignition timing is performed to the limit of stability, using a crank angle sensor signal, enabling using up the HC minimizing potential the engine has, regardless of various disturbances occurring in the environment of practical use.

In particular, when control for the air-fuel ratio is being performed (when retarding control is not being performed) based on the crank angle sensor signal, if the ignition timing is on the retard side relative to a predetermined value, the ignition timing is first brought back to the advance side to secure a margin for stability, so as to enable the air-fuel ratio to be controlled to be leaner, allowing HC emissions to be reduced without relatively not deteriorating the stability.

What is claimed is:

1. An engine controller comprising:
   air-fuel ratio control means for controlling an air-fuel ratio to be within a predetermined range when an engine is operated at a certain driving condition; and ignition timing correction means for correcting ignition timing to a retard side when the engine is operated at the certain driving condition and the air-fuel ratio is within the predetermined range; wherein, the air-fuel ratio control means, when the engine speed variation is below a predetermined range A, makes correction to decrease a fuel injection amount until the engine speed variation reaches within the predetermined range A, when the engine speed variation is above the predetermined range A, makes correction to increase the fuel injection amount until the engine speed variation reaches within the predetermined range A, and when the engine speed variation is within the predetermined range A, keeps the correction value for the fuel injection amount;

after the air-fuel ratio control means keeps the correction amount for the fuel injection amount, the ignition timing correction means, when the engine speed variation is below a predetermined range B, corrects the ignition timing to the retard side until the engine speed variation reaches within the predetermined range B, when the engine speed variation is above the predetermined range B, corrects the ignition timing to an advance side until the engine speed variation reaches within the predetermined range B, and when the engine speed variation is within the predetermined range B, stops revision of the correction of the ignition timing and keeps the correction value; and the predetermined range A is set to be smaller than the predetermined range B.

2. The engine controller according to claim 1, wherein the predetermined range of the air-fuel ratio controlled by the air-fuel ratio control means is from 14.5 to 16.5.

3. The engine controller according to claim 1, further comprising:
air-fuel ratio detection means for directly or indirectly detecting the air-fuel ratio; and
degree of stability detection means for directly or indirectly detecting degree of stability of the engine, wherein,
the air-fuel ratio control means performs the control based on the detected air-fuel ratio, and the ignition timing correction means performs the correction based on the detected degree of stability.

4. The engine controller according to claim 3, wherein the ignition timing correction means corrects the ignition timing to the retard side based on the detected degree of stability after the air-fuel ratio is controlled by the air-fuel ratio control means to be within the predetermined range.

5. The engine controller according to claim 4, wherein:
the air-fuel detection means is a sensor that is selected from the group consisting of an air-fuel ratio sensor, an oxygen sensor and a sensor that detects another exhaust component; and
said sensor is arranged in an exhaust passageway.

6. The engine controller according to claim 3, wherein:
the air-fuel detection means is a sensor that is selected from the group consisting of an air-fuel ratio sensor, an oxygen sensor and a sensor that detects another exhaust component; and
said sensor is arranged in an exhaust passageway.

7. The engine controller according to claim 3, wherein the air-fuel ratio detection means detects the air-fuel ratio based on at least one quantity selected from the group consisting of in-cylinder pressure variation and engine speed variation.

8. The engine controller according to claim 7, wherein at least one of the air-fuel ratio detection means and the degree of stability detection means calculates an n-th order derivative component (n=1, 2 . . . ) of a rotation speed of the engine, as the engine speed variation.

9. The engine controller according to claim 3, wherein the degree of stability detection means detects the degree of stability based on at least one quantity selected from the group consisting of in-cylinder pressure variation and engine speed variation.

10. The engine controller according to claim 9 comprising:
engine speed variation detection means for detecting the engine speed variation as the air-fuel ratio detection means and the degree of stability detection means; and
switching means for selectively switching between control performed by the air-fuel ratio control means based on the engine speed variation detected by the engine speed variation detection means and the correction made by the ignition timing correction means based on the engine speed variation.

11. The engine controller according to claim 10, wherein the switching means causes the air-fuel ratio control means to control the air air-fuel ratio to be within the predetermined range, and then causes the ignition timing correction means to make the correction.

12. The engine controller according to claim 10, wherein:
the air-fuel ratio control means keeps an air-fuel ratio control parameter so that the air-fuel ratio is maintained within the predetermined range after the air-fuel ratio is controlled to be within the predetermined range based on the engine speed variation; and
the ignition timing correction means corrects the ignition timing to a retard side based on the engine speed variation when the air-fuel ratio is maintained within the predetermined range.

13. The engine controller according to claim 1, further comprising means for preventing the ignition timing from being controlled to the retard side when the air-fuel ratio is not controlled to be within the predetermined range.

14. The engine controller according to claim 1, further comprising means for, when the air-fuel ratio is not controlled to be within the predetermined range, if the ignition timing is on the retard side relative to a predetermined value, first making the ignition timing correction means perform an operation to bring the ignition timing back to the advance side, and then making the air-fuel ratio control means perform an operation to control the air-fuel ratio to be within the predetermined range.

15. The engine controller according to claim 1, wherein when a temperature of a catalyst provided in the exhaust passageway has no more than a predetermined value or the catalyst's purification efficiency has no more than a predetermined value, the air-fuel ratio control means and the ignition timing correction means perform the control and the correction.

* * * * *